United States Patent
Furuhashi et al.

(10) Patent No.: US 6,583,771 B1
(45) Date of Patent: Jun. 24, 2003

(54) DISPLAY CONTROLLER FOR CONTROLLING MULTI-DISPLAY TYPE DISPLAY, METHOD OF DISPLAYING PICTURES ON MULTI-DISPLAY TYPE DISPLAY, AND MULTI-DISPLAY TYPE INFORMATION PROCESSING SYSTEM

(75) Inventors: Tsutomu Furuhashi, Yokohama (JP); Tatsumi Mori, Isehara (JP); Shigeyuki Nishitani, Yokohama (JP); Naruhiko Kasai, Yokohama (JP); Makiko Ikeda, Yokohama (JP); Hideki Kamimaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/438,487

(22) Filed: Nov. 12, 1999

(30) Foreign Application Priority Data

Nov. 13, 1998  (JP) .......................... 10-323154

(51) Int. Cl.⁷ ................................ G09G 5/00
(52) U.S. Cl. ........................ 345/1.1; 345/1.3
(58) Field of Search .................. 345/1.1, 1.2, 1.3, 345/3.1, 3.3, 668, 667, 698, 10, 13

(56) References Cited

U.S. PATENT DOCUMENTS

| | | | | |
|---|---|---|---|---|
| 4,990,904 A | * | 2/1991 | Zenda | 345/668 |
| 5,457,473 A | * | 10/1995 | Arai et al. | 345/10 |
| 6,020,863 A | * | 2/2000 | Taylor | 345/3.1 |

FOREIGN PATENT DOCUMENTS

| | | |
|---|---|---|
| JP | A6-214584 | 1/1993 |
| JP | 10-187109 | 7/1998 |

* cited by examiner

Primary Examiner—Chanh Nguyen
(74) Attorney, Agent, or Firm—Mattingly, Stanger & Malur, P.C.

(57) ABSTRACT

Each of a plurality of multi-display interfaces respectively associated with a liquid crystal panel is provided with setting circuits for setting a horizontal write start position, a horizontal write width, a vertical write start position, a vertical write width and an enlargement rate, a circuit for storing display data, and an ID setting circuit for setting an ID number for the liquid crystal panel. The multi-display interfaces read display data on the same or different regions to display images in various modes.

16 Claims, 19 Drawing Sheets

DISPLAY CONTROLLER FOR CONTROLLING MULTI-DISPLAY TYPE DISPLAY, METHOD OF DISPLAYING PICTURES ON MULTI-DISPLAY TYPE DISPLAY, AND MULTI-DISPLAY TYPE INFORMATION PROCESSING SYSTEM

BACKGROUND OF THE INVENTION

The present invention relates to a multi-display type display comprising a plurality of display units. More particularly, the present invention relates to an inexpensive display controller capable of achieving enlarged display and high-definition display, a multi-display, and a multi-display system.

A prior art multi-display system is disclosed in Japanese Patent Laid-open No. Hei 10-187109. This prior art multi-display system will be described with reference to FIG. 2.

Referring to FIG. 2, a monitor 201 comprises an image input unit 202, an A/D converter 203, a memory selector 204, an image memory A 205, an image memory B 206, a selecting processing unit 207, a D/A converter 208, a display unit 209, a control signal receiving unit 210, a decoder 211, a received control signal memory 212, an ID setting unit 213, a monitor system memory 214 and a monitor controller 215.

An image transmitter 216 comprises an image output 217, generator 218, a control signal transmitter 219, a control signal composing unit 220, a synchronizer 221, a monitor ID directory 222, a program code generator 223, a frame number generator 224, a system memory 225, a controller 226 and a monitor control program memory 227.

Indicated at 228 is an image signal line and at 229 is a control signal line.

In operation, the image signal generator 217 of the image transmitter 216 edits video signals provided by a camera, a VTR (video tape recorder) or a PC (personal computer) to provide an analog image signal representing a still image connecting all image data to be displayed on a plurality of monitors, and the image transmitter 216 provides the analog image signal on the image signal line 228. The control signal composing unit 220 combines data provided by the monitor ID directory 222, the program code generator 223, the frame number generator 224 and the monitor control program memory 227 to compose digital control signal for controlling the monitor 201. The thus composed digital control signal is synchronized by the synchronizer 221 with image data provided by the image transmitter 216 and is transferred to the monitor 201.

Image data transferred through the image signal line 228 operates according to the control signal transferred through the control signal line 229. The image data is converted into corresponding digital image data by the A/D converter 203. The digital image data is transferred through the memory selector 204 to and stored in the image memory A 205 or the image memory B 206. The selecting processing unit 207 selects either the image memory A 205 or the image memory B 206 and reads the stored digital image memory. The D/A converter 208 converts the digital image signal into corresponding analog image signal and sends the analog image signal to the display unit 209 and the display unit 209 displays an image represented by the analog image signal.

Since a control signal including a frame number for the image data, and an ID identifying the selected monitor 201 is transmitted in synchronism with the image data transmitted by the image transmitter 216, the image represented by the image data can be displayed on the plurality of monitors 201.

SUMMARY OF THE INVENTION

In the prior art multi-display system, a frame number and an ID number must be assigned to each image data and hence only still images can be transmitted.

Since an ID number identifying the corresponding display must be attached to display data, troublesome processing work is necessary for processing the display data.

Since the display is not provided with any means for displaying a single display data continuously on a plurality of displays, a display data server needs to carry out operations for displaying the display data continuously on the plurality of displays.

Accordingly, it is an object of the present invention to provide an inexpensive display controller capable of achieving enlarged display and high-definition display, a display, a multi-display, and a multi-display system comprising a plurality of liquid crystal displays.

According to a first aspect of the present invention, a display controller for controlling a display comprises an input data processor for processing input display data, a control data processor that receives control data including information specifying partial display data included in the display data, a data output unit that gives the input display data to the display unit, and a control unit that controls the data output unit according to the control data so that the partial data is given to the display unit.

Preferably, in the display controller, the control unit is provided with a storage unit capable of holding identification data (ID data), and may control the data output unit so that the partial display data is given to the display unit in response to the ID data held by the storage unit and the information included in the control data.

Preferably, in the display controller, the control data includes ID data, and the control unit controls the output unit so as to give the partial display data to the display unit when the ID data included in the control data coincide with each other.

According to a second aspect of the present invention, a controller for controlling a display comprises a plurality of input data processors that receive display data, a control data processor that receives control data, a display data selector that selects one of the plurality of input data processors according to the control data, and an output unit that gives the display data selected by the display data selector to the display.

According to a third aspect of the present invention, a controller for controlling a display comprises a input data processor that receives display data, a control data processor that receives control data, an output unit that sends out the input display data, and a control unit for controlling the output unit, wherein the output unit has a display data storage unit for storing the input display data, the control unit has a storage unit capable of holding a display data input stopping command included in the control data, and the output unit is controlled so as to stop an operation for storing the display data in the display data storage unit while the display data input stopping command is held by the storage unit.

According to a fourth aspect of the present invention, each of a plurality of displays comprises a display unit that displays images, a display controller that gives display data to the display unit, wherein the display controller comprises an input data processor that receives the display data, a control data processor that receives control data and a storage unit capable of holding data on positions of the plurality of arranged displays, and the display unit is given the display data when the data held by the storage unit and the data included in the input control data coincide with each other.

According to a fifth aspect of the present invention, a multi-display comprises a plurality of display units arranged in an M×N rectangular array, and a plurality of display controllers respectively for controlling the plurality of displays, wherein each display controller has a storage unit capable of holding information indicating the position of the corresponding display unit in the M×N rectangular array.

According to a sixth aspect of the present invention, a multi-display system comprises a plurality of display units arranged in an M×N rectangular array, a plurality of display controllers respectively for controlling the display of the plurality of display units, and a controller that provides control data including information about the respective positions of the plurality of display units in the M×N rectangular array, wherein each display controller has a storage unit holding information indicating the position of the corresponding display in the M×N rectangular array.

According to a seventh aspect of the present invention, a method of displaying images on a plurality of displays arranged in an M×N rectangular array comprises the steps of holding information about positions of the plurality of displays in the M×N rectangular array by the plurality of displays and a controller that controls each of the plurality of displays and operations for displaying images on the plurality of displays, sending control data including information representing positions of the plurality of displays in the M×N rectangular array from the controller to each of the plurality of displays, receiving information representing positions of the plurality of displays in the M×N rectangular array by the plurality of displays, comparing the sent information representing positions of the plurality of displays in the M×N rectangular array with the information held by the plurality of displays representing positions of the plurality of displays in the M×N rectangular array, and displaying, when both information coincide with each other, portions of an image given to the plurality of displays on the plurality of displays.

According to an eighth aspect of the present invention, an information processor connected to a display provided with a plurality of display units comprises an input means for providing position data representing positions of the plurality of display units, a storage means for storing the position data provided by the input means, a display position determining means for determining portions of an image to be displayed on the plurality of display units on the basis of the position data stored by the storage means, and transmission means for transmitting control data corresponding to display positions determined by the display position determining means to the display.

According to a ninth aspect of the present invention, a method of controlling display to a plurality of display units comprises the steps of receiving position data about positions of the plurality of display units, holding the position data on the respective positions of the plurality of display units, determining image displaying positions on the plurality of display units by using the position data on the respective positions of the plurality of display units, and transmitting control data based on the determined displaying positions to the display.

DESCRIPTION OF THE PREFERRED EMBODIMENTS

A multi-display in a first embodiment according to the present invention will be described with reference to FIGS. 1 and 3 to 8.

Figure 1:
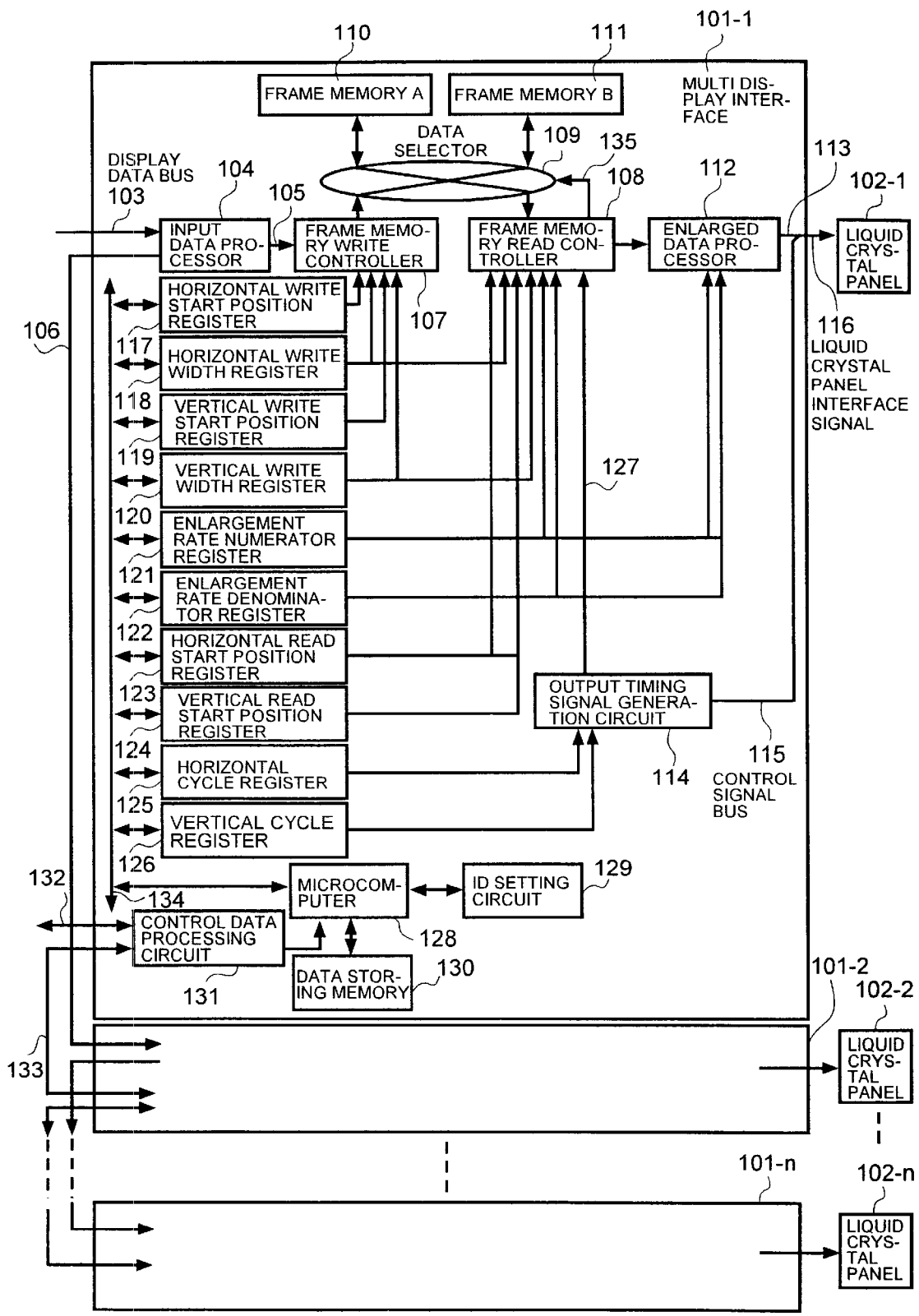
FIG. 1 is a block diagram of a multi-display.
Figure 2:
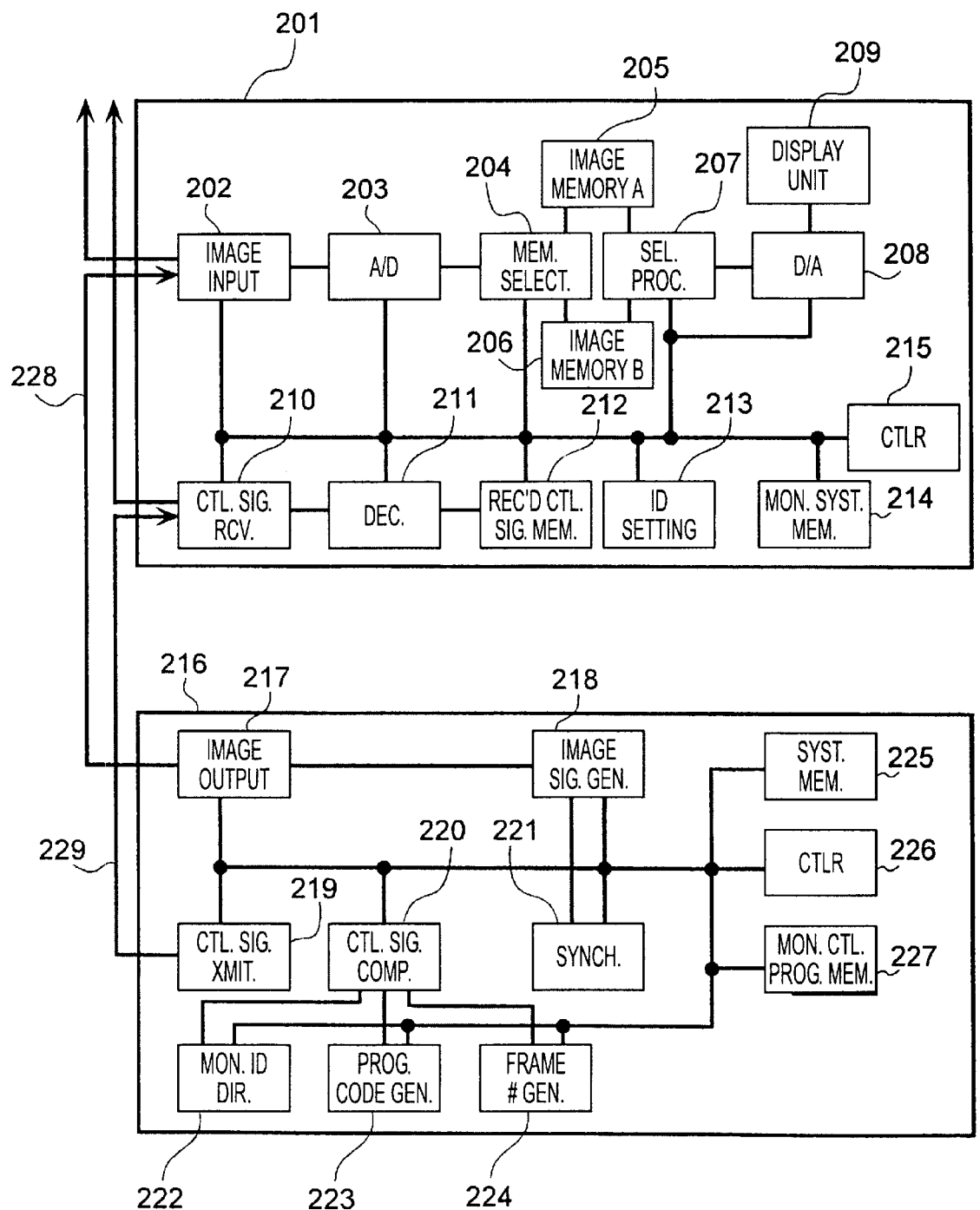
FIG. 2 is a block diagram of a prior art multi-display.
Figure 3:
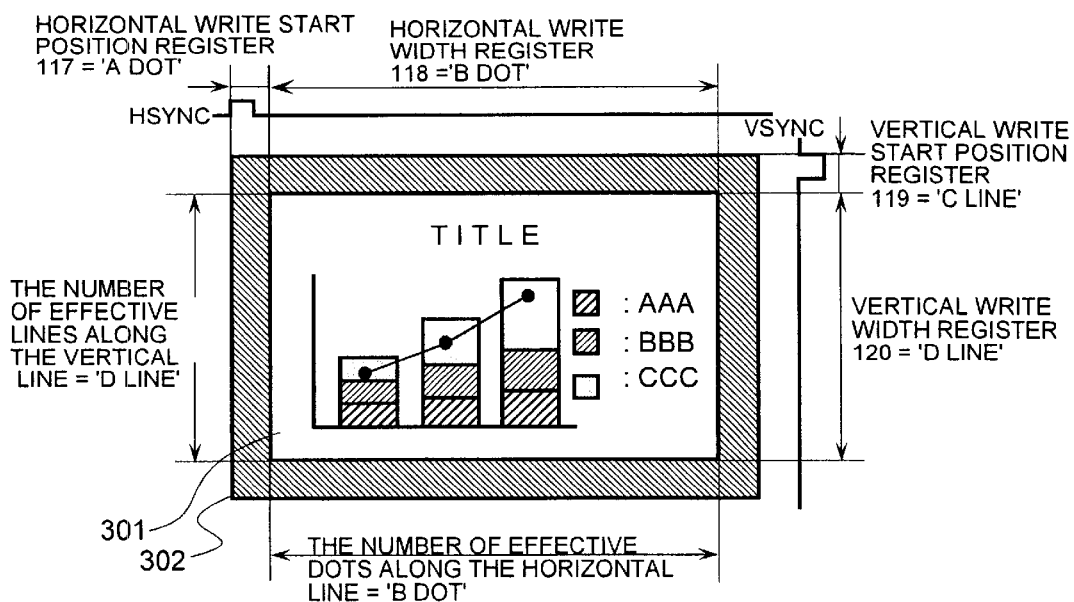
FIG. 3 is a pictorial view of assistance in explaining an input display data format and register setting.
Figure 4:
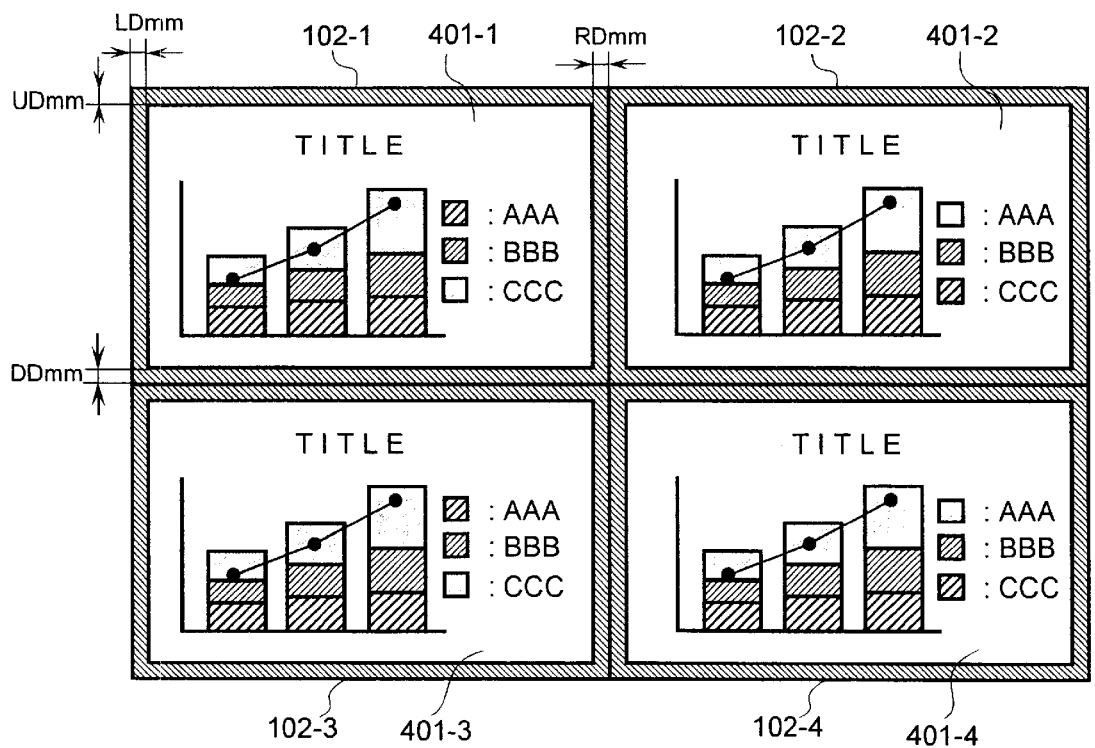
FIG. 4 is a pictorial view of assistance in explaining a displayed image.
Figure 5:
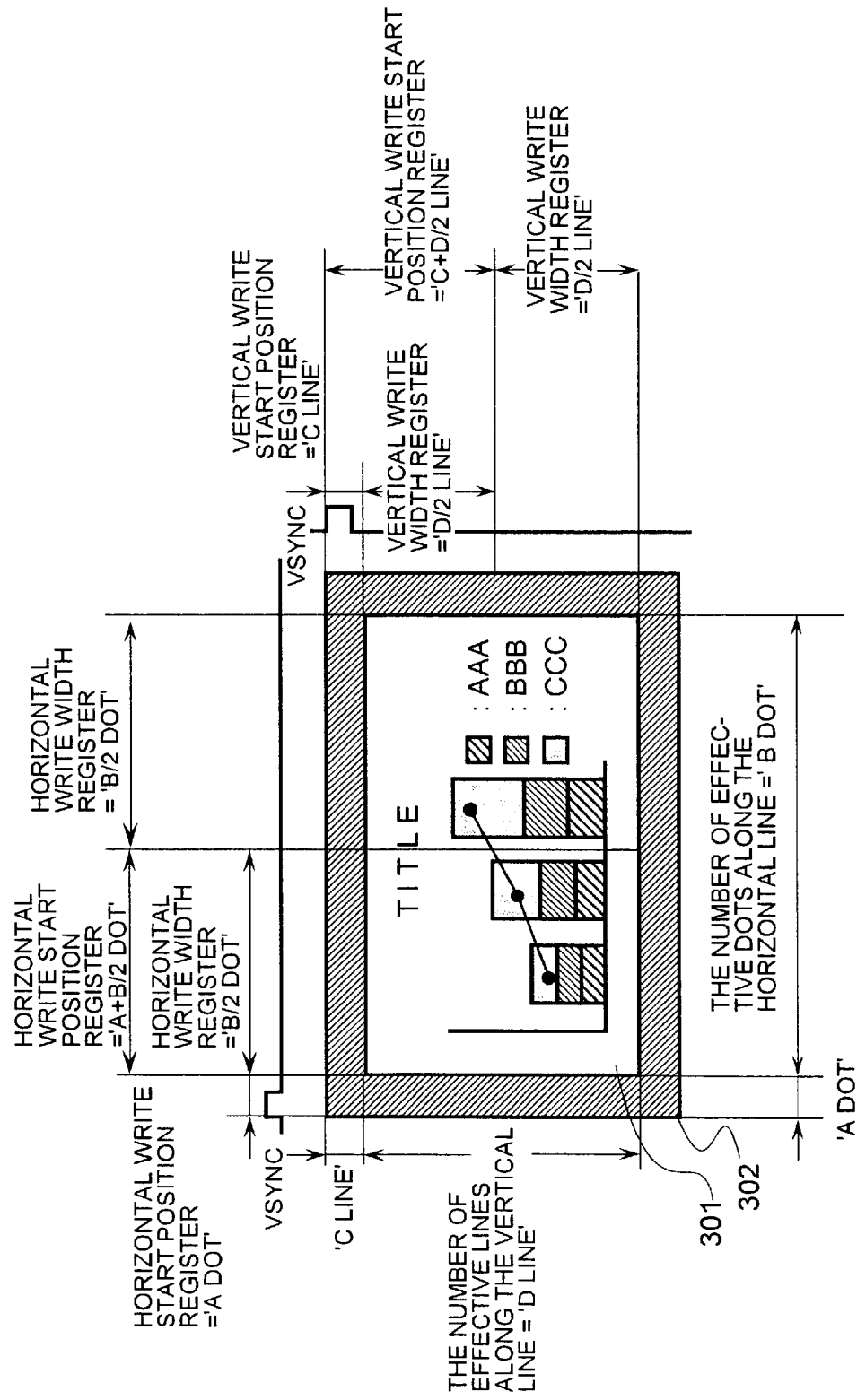
FIG. 5 is a pictorial view of assistance in explaining an input display data format and resister setting.
Figure 6:
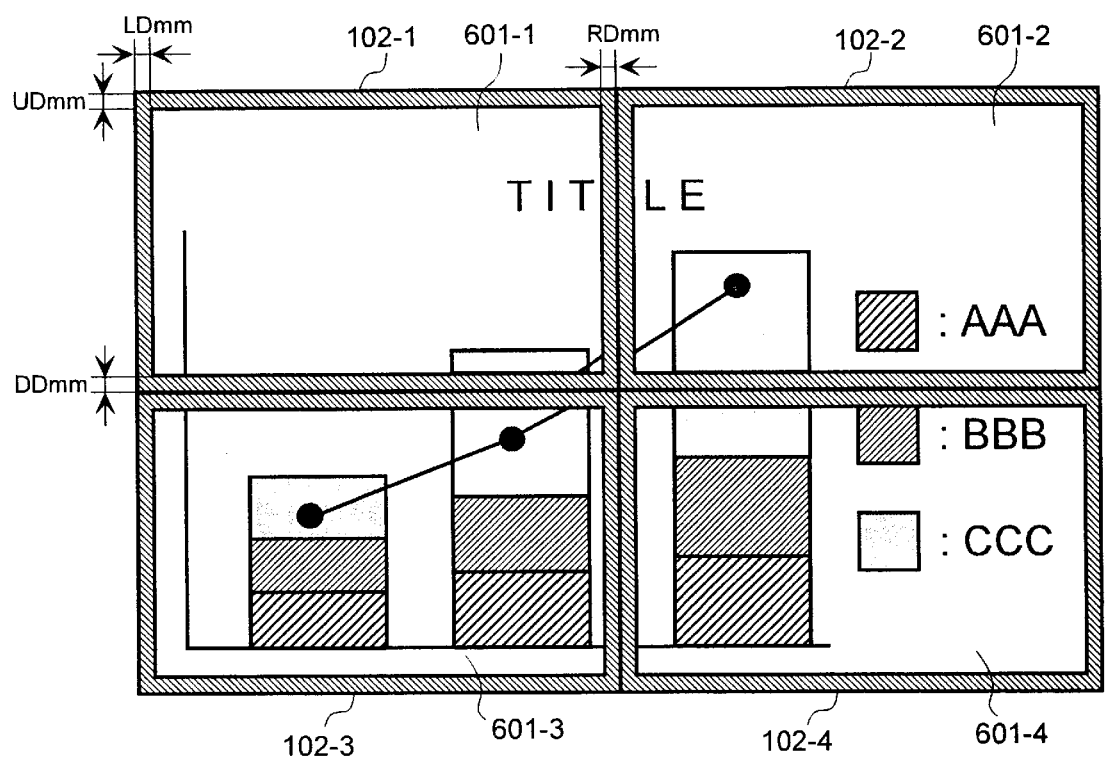
FIG. 6 is a pictorial view of assistance in explaining a displayed image.
Figure 7:
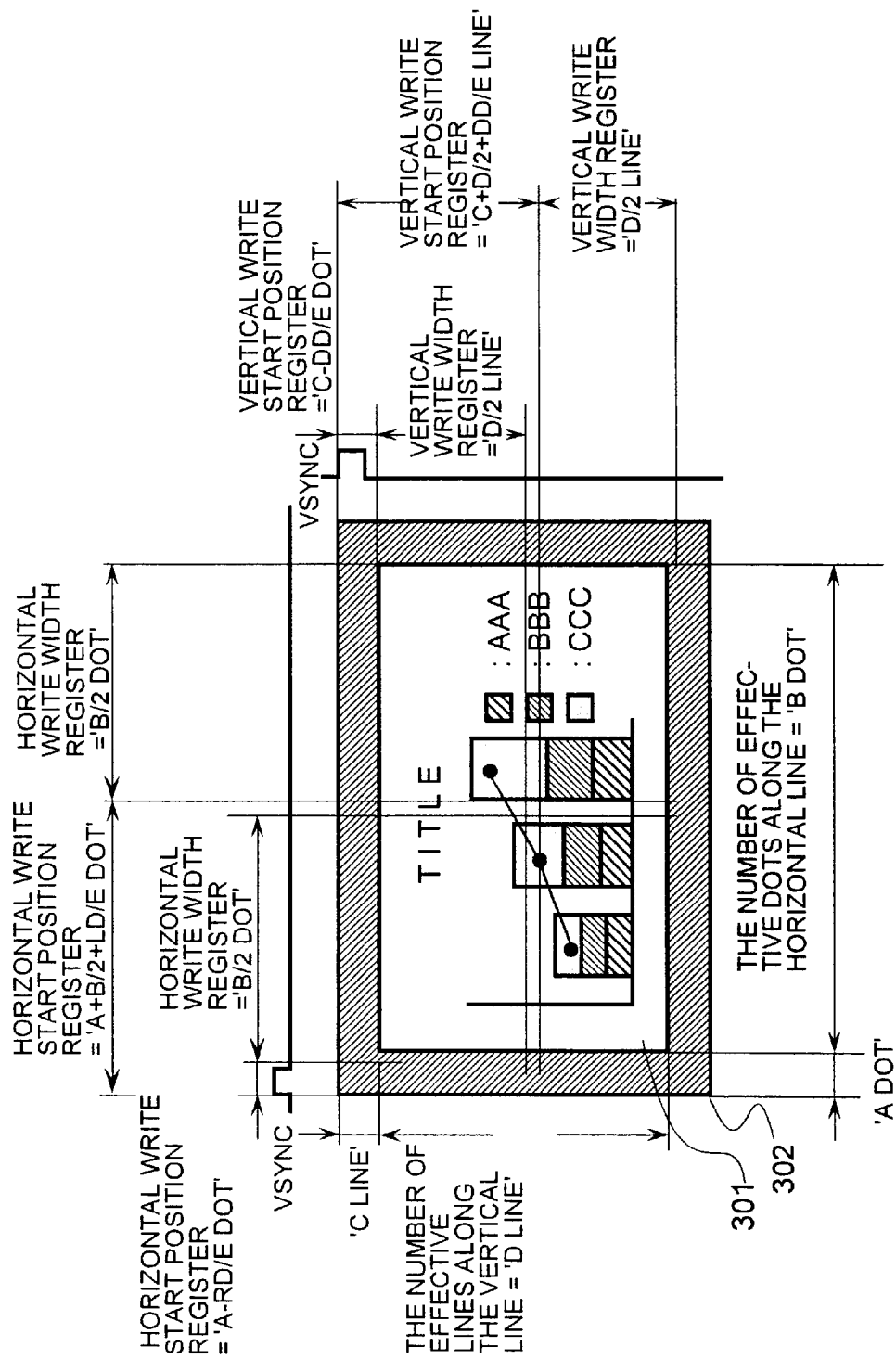
FIG. 7 is a pictorial view of assistance in explaining an input display data format and register setting.
Figure 8:
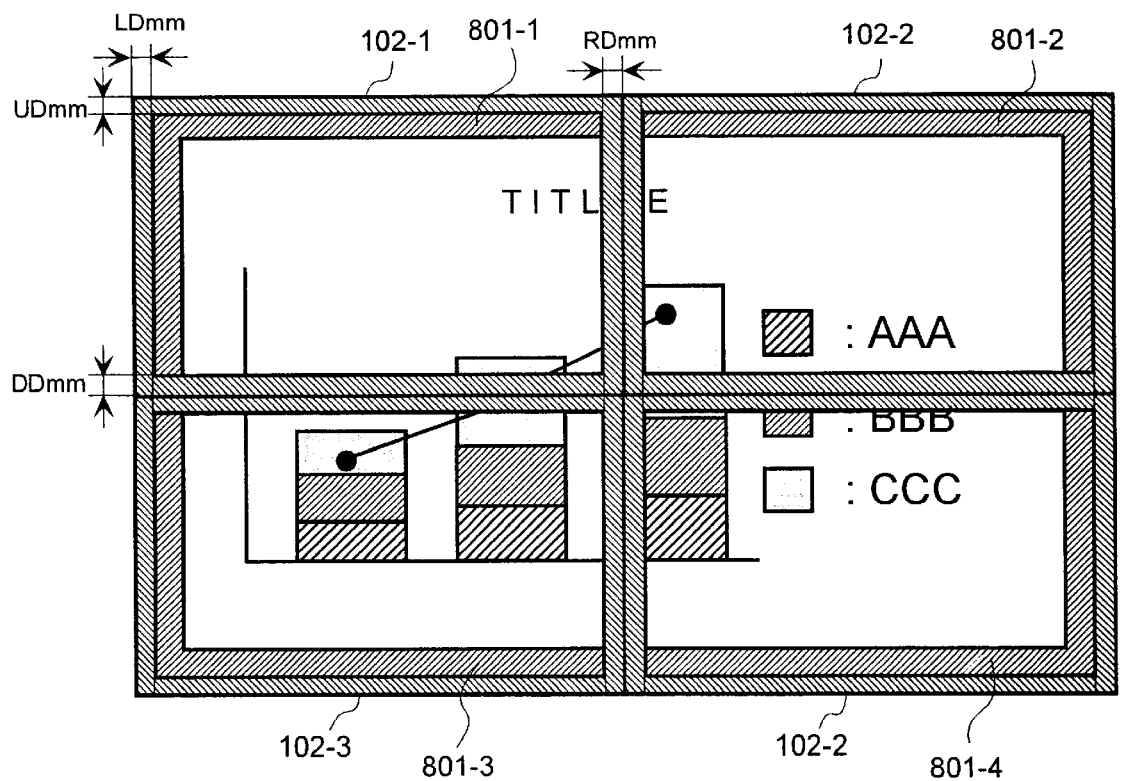
FIG. 8 is a pictorial view of assistance in explaining another displayed image.

FIG. 1 is a block diagram of the multi-display, FIG. 3 shows an input display data format, and set values set in each register when the multi-display comprises four liquid crystal panels (the same display screens), FIG. 4 shows a displayed image represented by the set values set in each register shown in FIG. 3, FIG. 5 shows an input display data format and set values set in each register when the multi-display comprises four liquid crystal panels (no display correction), FIG. 6 shows a displayed image (enlarged image) represented by the set values set in each register shown in FIG. 5, FIG. 7 shows an input display data format and set values set in each register when the multi-display comprises four liquid crystal panels (display correction) and FIG. 8 shows a displayed image (enlarged image) represented by set values set in each register shown in FIG. 7.

Referring to FIG. 1, indicated at 101 are multi-display interfaces, i.e., display controllers according to the present invention, and at 102 are liquid crystal panels, i.e., display devices. The liquid crystal panels 102 may be substituted by other display devices, such as CRTs or plasma displays.

Adjuncts -1, -2, . . . , and -n are the numbers of the n multi-display interfaces 101 and those of the n liquid crystal panels 102, in which n is an integer not smaller than 1. In this specification, a combination of one multi-display interface (display controller) 101 and one liquid crystal display (display device) 102 will sometimes be referred to as a display unit. A combination of the plurality of display units will be referred to as a multi-display system.

Shown in FIG. 1 are a display data bus 103 through which display data is received, an input data processor 104, a display data bus 105 through which display data is transferred in the multi-display interface 101, a display data bus 106 through which display data is transferred to the next multi-display interface 101.

Shown also in FIG. 1 are a frame memory write controller, a frame memory read controller 108, a data selector 109, a frame memory A 110, a frame memory B 111, an enlarged data processor 112, a display data bus 113 through which display data provided by the enlarged data processor 112 is transferred, an output timing signal generator 114, a control signal bus 115 through which a synchronizing signal, i.e., an output timing signal provided by the output timing signal generator 114 is transferred, and a liquid crystal panel interface signal 116 produced by combining the display data transferred through the display data bus 113 and the synchronizing signal transferred through the control signal bus 115.

Shown also in FIG. 1 are a horizontal write start position register 117, a horizontal write width register 118, a vertical write start position register 119 and a vertical write width register 120. These registers set storage regions in the frame memory A 110 and the frame memory B 111 for storing the display data transferred through the display data buses 103 and 105.

Shown also in FIG. 1 are an enlargement rate numerator register in which the numerator H of enlargement rate H/I (H and I are positive integers) is stored, an enlargement rate denominator register in which the denominator I of enlargement rate H/I is stored, a horizontal read start position register 123 and a vertical read start position register 124. A horizontal read width and a vertical read width are stored in the horizontal write width register 118 and the vertical write width register 120, respectively. Positions in the frame memory A 110 and the frame memory B 111 from which the display data to be displayed on the liquid crystal panel 102 can be determined by the registers.

Shown also in FIG. 1 are a horizontal cycle register 125 and a vertical cycle register 126, which set the respective cycles of the horizontal synchronizing signal and the vertical synchronizing signal generated by the output timing signal generator 114, respectively. Since the cycles are thus set, images can be displayed on the liquid crystal panels 102 respectively having different timing modes. A timing signal 127 generated by the output timing signal generator 114 times the operation of the frame memory read controller 108.

Shown also in FIG. 1 are a microcomputer 128, an ID setting circuit 129 holding ID numbers, i.e., identification data, a data storing memory 130, a control data processor 131, a control signal bus 132 through which control data is exchanged between an external system and the control data processor 131, a control signal bus 133 connected to the next multi-display interface 101 to exchange control data between the adjacent multi-display interfaces 101, an internal data bus 134 extended in the multi-display interface 101 to exchange data between the microcomputers 128 and the registers and a selecting signal 135 for selecting either the frame memory A 110 or the frame memory B 111 to read display data therefrom.

In the following description, a circuit comprising the frame memory write controller 107, the frame memory read controller 108, the frame memory A 110, the frame memory B 111 and the enlarged data processor 112 will be referred to as a data output unit.

In the following description, a circuit comprising the registers 117, 118, 119, 120, 121, 122, 123, 124, 125 and 126, the output timing signal generator 114, the ID setting circuit 129, the microcomputer 128 and the data storing memory 130, for controlling the data output unit will be referred to as a control unit.

Referring again to FIG. 1, display data provided by the system is transferred through the display data bus 103 to the input data processor 104. The display data is transferred from the input data processor 104 through the display data bus 105 to the frame memory write controller 107 which is a constituent of the data output unit. The frame memory write controller 107 has a horizontal counter and a vertical counter, compares values set in the horizontal write start position register 117, the horizontal write width register 118, the vertical write start position register 119 and the vertical write width register 120 with counts provided by the horizontal and the vertical counter, determines a write region in the frame memory A 110 or the frame memory B 111, and performs a write operation.

A write position with respect to a horizontal direction in the frame memory A 110 or the frame memory B 111 can be controlled by changing the set value set in the horizontal write start position register 117. A horizontal write width in the frame memory A 110 or the frame memory B 111 can be controlled by changing the set value set in the horizontal write width register 118. A write position with respect to a vertical direction in the frame memory A 110 or the frame memory B 111 can be controlled by changing the set value set in the vertical write start position register 119. A vertical write width in the frame memory A 110 or the frame memory B 111 can be controlled by changing the set value set in the vertical write width register 120.

Suppose that the set value set in the horizontal read start position register 123 is fixed and the set value set in the horizontal write start position register 117 is reduced. Then, an operation for receiving data is started before the display data representing an image to be displayed (hereinafter referred to as "effective display data") is started. Consequently, excessively received data is displayed; that is, the display screen moves to the right. If the set value set in the horizontal write start position register 117 is increased, the operation for receiving data is started after the effective display data has started. Consequently, necessary data cannot be displayed and the effective display data is displayed partly and the display screen moves to the left.

The display data written to either the frame memory A 110 or the frame memory B 111 is read by the frame memory read controller 108 and is transferred through the enlarged data processor 112 to the liquid crystal panel 102. The multi-display interface 101 is provided with the two frame memories, i.e., the frame memory A 110 and the frame memory B 111, to read display data to be transferred to the liquid crystal panel 102 from the frame memory B 111 while input display data is being written to the frame memory A 110, and to read display data to be transferred to the liquid crystal panel 102 from the frame memory A 110 while input display data is being written to the frame memory B 111.

The microcomputer 128 of the control unit receives a command included in control data transferred thereto through the control signal bus 132 and loads data stored in the data storing memory 130 into the registers. The command specifies a partial display data, i.e., a portion of the display data. Upon the reception of the command specifying partial display data, the microcomputer 128 of the control unit loads data into the registers so that the data output unit provides the partial display data.

In some cases, an ID number, i.e., identification data, is assigned to the command included in the control data transferred through the control signal bus 132. The ID number specifies one of the multi-display interfaces 101 to execute the command. The microcomputer 128 compares the ID number assigned to the command with a set ID number set in the ID setting circuit 129, and executes the command when those ID numbers coincide with each other.

Operations for displaying an image shown in FIG. 3 on the four liquid crystal panels 102 included in a multi-display having the four display units each of the multi-display interface 101 and the liquid crystal display 102 as shown in FIG. 4.

FIG. 3 shows a display data format provided by an external system, and set values set in the registers when the multi-display has four liquid crystal panels 4 having the same display screens. Display data 302 is received from an external system. The display data is effective in a region 301, i.e., an effective display data region. A horizontal synchronizing signal HSYNC is a reference signal for display data for one horizontal line. A vertical synchronizing signal VSYNC is a reference signal for one frame.

The display data becomes effective at time A dots from the leading edge of the horizontal synchronizing signal HSYNC with respect to a horizontal direction. The display data is effective in a horizontal range corresponding to B dots. The display data becomes effective at time C lines from the leading edge of the vertical synchronizing signal VSYNC with respect to a vertical direction. The display data is effective in a vertical range corresponding to D lines.

FIG. 4 shows images displayed according to the set values shown in FIG. 3 set in the registers. Indicated at 102-1, 102-2, 102-3 and 102-4 are the liquid crystal displays, and at 401-1, 401-2, 401-3 and 401-4 are the respective display regions of the liquid crystal panels 102-1, 102-2, 102-3 and 102-4.

Values of the data are designated by the same reference characters as in FIG. 3 to facilitate understanding the explanation; that is, the horizontal effective display region with respect to a horizontal direction on each liquid crystal panel 102 corresponds to B dots, and the vertical effective display region with respect to a vertical direction corresponds to D lines.

The height of an upper non-display region on each liquid crystal display 102 is UD mm, the height of a lower non-display region on each liquid crystal display 102 is DD mm, the width of a right non-display region on each liquid crystal display 102 is RD mm, and the width of a left non-display region on each liquid crystal display 102 is LD mm. If pixels (dots) are arranged at a pitch of E mm, the height of the upper non-display region on each liquid crystal display 102 corresponds to UD/E dots, the height of the lower non-display region on each liquid crystal display 102 corresponds to DD/E dots, the width of the right non-display region on each liquid crystal display 102 corresponds to RD/E dots, and the width of the left non-display region on each liquid crystal display 102 corresponds to LD/E dots.

The adjuncts -1, -2, -3 and -4 to the reference numeral 102 indicating the liquid crystal panels corresponds to the ID numbers of the liquid crystal displays 102, respectively. The liquid crystal panels 102-1, 102-2, 102-3 and 102-4 identified by ID numbers 1, 2, 3 and 4, respectively, are disposed in an upper left corner, an upper right corner, a lower left corner and a lower right corner, respectively.

To facilitate understanding the explanation, it is supposed that the resolution of the input display data represented by the number of effective dots along the horizontal line (B dots) and the number of effective lines along the vertical direction (D lines) is equal to that of the liquid crystal panels 102.

When displaying the image shown in FIG. 3 in a display mode shown in FIG. 4, control data provided by an external system includes information including commands that make the multi-display interfaces 101 control image displaying operations so that the image shown in FIG. 3 is partial display data. ID numbers are assigned to the commands, respectively. Upon the reception of the command, each multi-display interface 101 sets values in the registers of the control unit as follows.

A number of dots (A dots) corresponding to a range from the leading edge of the horizontal synchronizing signal HSYNC to a horizontal write start position is set in the horizontal write start position register 117.

A number of dots corresponding to the horizontal width of the effective display data (B dots) is set in the horizontal write width register 118. A number of lines (C lines) corresponding to a range from the leading edge of the vertical synchronizing signal VSYNC to a vertical write start position is set in the vertical write start position register 119. A number of lines (D lines) corresponding to the vertical width of the effective display data is set in the vertical write width register 120. A value of 1 is set in the enlargement rate numerator registers 121 and the enlargement rate denominator registers 122 for a magnification of 1 (one). The same display regions in the display data provided by the system is stored in and read from the frame memories A 110 and the frame memories B 111 of the multi-display interfaces 101-1, 101-2, 101-3 and 101-4 connected to the liquid crystal panels 102-1, 102-2, 102-3 and 102-4 identified by the ID numbers 1, 2, 3 and 4, respectively. Consequently, the same images are displayed on the liquid crystal displays 102-1, 102-2, 102-3 and 102-4.

Operations for displaying divisions of an image shown in FIG. 5 in enlarged images on the four liquid crystal panels 102-1, 102-2, 102-3 and 102-4 of the multi-display as shown in FIG. 6 will be described. In FIG. 6, indicated at 601-1, 601-2, 601-3 and 601-4 are the respective display regions of the liquid crystal displays 102-1, 102-2, 102-3 and 102-4.

Information included in control data to be used by the operations includes commands instructing the multi-display interfaces 101 to control displaying operations so that the image shown in FIG. 5 is represented by partial display data. The commands are identified by the ID numbers, respectively. Upon the reception of the commands, the multi-display interfaces 101 sets values in the registers of the control units in the following manner.

As shown in FIG. 5, in setting operations relating to the liquid crystal panels 102-1 and 102-3 identified by the ID numbers 1 and 3, respectively, a number of dots corresponding to a range from the leading edge of the horizontal synchronizing signal HSYNC to a horizontal write start position (A dots) is set in the horizontal write start position registers 117, and a number of dots corresponding to half the horizontal width of the effective display data (B/2 dots) is set in the horizontal write width registers 118. In setting operations relating to the liquid crystal panels 102-2 and 102-4 identified by the ID numbers 2 and 4, respectively, a number of dots (A+B/2 dots) equal to the sum of the number of dots corresponding to a range from the leading edge of the horizontal synchronizing signal HSYNC to the horizontal write start position (A dots) and a number of dots corresponding to half the horizontal width of the effective display data (B/2 dots) is set in the horizontal write start position registers 117, and a number of dots corresponding to half the horizontal width of the effective display data (B/2 dots) is set in the horizontal write width registers 118.

In setting operations relating to the liquid crystal panels 102-1 and 102-2 identified by the ID numbers 1 and 2, a number of lines corresponding to a range from the leading edge of the vertical synchronizing signal VSYNC to an effective display data start position (C lines) is set in the vertical write start position registers 119, and a number of lines equal to half the number of lines corresponding to the effective display data (D/2 lines) is set in the vertical write width registers 120. In setting operations relating to the liquid crystal panels 102-3 and 102-4 identified by the ID numbers 3 and 4, the sum (C+D/2) of a number of lines corresponding to a range from the leading edge of the vertical synchronizing signal VSYNC to an effective display data start position (C lines) and half a number of lines corresponding to the effective display data (D/2 lines) is set in the vertical write start position registers 119, and a number of lines equal to half a number of lines corresponding to the effective display data (D/2) is set in the vertical write width registers 120.

A value of 2 is set in the enlargement rate numerator registers 121 of all the multi-display interfaces 101, and a value of 1 is set in the enlargement rate denominator registers 122 of the same to display the image shown in FIG. 6.

The liquid crystal panel 102-1 with the ID number 1 displays a portion of the input display data for one frame corresponding to an upper left screen at a magnification of 2, the liquid crystal panel 102-2 with the ID number 2 displays a portion of the input display data for one frame corresponding to an upper right screen at a magnification of 2, the liquid crystal panel 102-3 with the ID number 3 displays a portion of the input display data for one frame corresponding to a lower left screen at a magnification of 2, and the liquid crystal panel 102-4 with the ID number 4 displays a portion of the input display data for one frame corresponding to a lower right screen at a magnification of 2.

Thus the display data transferred through the display data bus 103 can be displayed in an enlarged image by the four liquid crystal panels 102 of the multi-display.

In FIG. 6, a sloping curve included in the image shown in FIG. 6 is discontinuous. A displaying method capable of displaying a continuous sloping curve will be described with reference to FIGS. 7 and 8.

The sloping line becomes "discontinuous" because of the following reasons. Display data continuous with the upper side of the liquid crystal panel 102-3 with the ID number 3 jumps over the lower non-display region of the liquid crystal panel 102-1 with the ID number 1 and the upper non-display region of the liquid crystal panel 102-3 with the ID number 3, and is displayed on the liquid crystal panel 102-1 with the ID number 1. Therefore, the horizontal position of the ending point of the curve displayed on the liquid crystal panel 102-3 with the ID number 3 coincides substantially with the horizontal position of the starting point of the curve displayed on the liquid crystal panel 102-1 with the ID number 1, so that the curves displayed in the liquid crystal panel 102-3 with ID number 3 and the liquid crystal panel 102-1 with ID number 1 are discontinuous. Similarly, the display data continuous with the right side of the liquid crystal panel 102-1 with the ID number 1 jumps over the right non-display region of the liquid crystal panel 102-1 with the ID number 1 and the left non-display region of the liquid crystal panel 102-2 with the ID number 2, and is displayed on the liquid crystal panel 102-2 with the ID number 2. The vertical position of the ending point of a curve displayed on the liquid crystal panel 102-1 with the ID number 1 coincides substantially with that of the starting point of a curve displayed on the liquid crystal panel 102-2 with the ID number 2, so that the curves displayed in the liquid crystal panel 102-1 with the ID number 1 and the liquid crystal panel 102-2 with the ID number 2 are discontinuous.

As mentioned above, if pixels (dots) are arranged at a pitch of E mm, the height of the upper non-display region on each liquid crystal display 102 corresponds to UD/E dots, the height of the lower non-display region on each liquid crystal display 102 corresponds to DD/E dots, the width of the right non-display region on each liquid crystal display 102 corresponds to RD/E dots, and the width of the left non-display region on each liquid crystal display 102 corresponds to LD/E dots.

Different values are set in the registers of the multi-display interfaces 101 connected to the liquid crystal panels 102, respectively.

Referring to FIG. 7, in setting operations relating to the liquid crystal panels 102-1 and 102-3 identified by the ID numbers 1 and 3, respectively, a number of dots (A-RD/E dots) determined by subtracting the number of dots (RD/E dots) corresponding to the width of the right non-display region of the liquid crystal panel 102 from the number of dots corresponding to a range from the leading edge of the horizontal synchronizing signal HSYNC to a horizontal write start position (A dots) is set in the horizontal write start position registers 117, and a number of dots corresponding to half the horizontal width of the effective display data (B/2 dots) is set in the horizontal write width registers 118. In setting operations relating to the liquid crystal panels 102-2 and 102-4 identified by the ID numbers 2 and 4, respectively, a number of dots (A+B/2+LD/E dots) equal to the sum of the number of dots corresponding to a range from the leading edge of the horizontal synchronizing signal HSYNC to the horizontal write start position (A dots), a number of dots corresponding to half the horizontal width of the effective display data (B/2 dots) and a number of dots corresponding to the width of the left non-display region of the liquid crystal panel 102 (LD/E dots) is set in the horizontal write start position registers 117, and a number of dots corresponding to half the horizontal width of the effective display data (B/2 dots) is set in the horizontal write width registers 118.

In setting operations relating to the liquid crystal panels 102-1 and 102-2 identified respectively, by the ID numbers 1 and 2, a number of lines (C−DD/E dots) determined by subtracting the number lines corresponding to the width of the lower non-display region of the liquid crystal panel 102 (DD/E lines) from the number of lines corresponding to a range from the leading edge of the vertical synchronizing signal VSYNC to an effective display data start position (C lines) is set in the vertical write start position registers 119, and a number of lines equal to half the number of lines corresponding to the effective display data (D/2 lines) is set in the vertical write width registers 120.

Consequently, the display data including non-display data and transferred through the display data bus 103 is written to the frame memory A 110 or the frame memory B 111. In setting operations relating to the liquid crystal panels 102-3 and 102-4 identified respectively by the ID numbers 3 and 4, the sum (C+D/2+UD/E dots) of a number of lines corresponding to a range from the leading edge of the vertical synchronizing signal VSYNC to an effective display data start position (C lines), half a number of lines corresponding to the effective display data (D/2 lines) and a number of lines corresponding to the width of the upper non-display region of the liquid crystal panel 102 (UD/E dots) is set in the vertical write start position registers 119, and a number of lines equal to half a number of lines corresponding to the effective display data (D/2) is set in the vertical write width registers 120.

Consequently, the display data including non-display data and transferred through the display data bus 103 is written to the frame memory A 110 or the frame memory B 111.

A value of 2 is set in the enlargement rate numerator registers 121 of all the multi-display interfaces 101, and a value of 1 is set in the enlargement rate denominator registers 122 of the same.

Thus the image shown in FIG. 8 can be displayed. Since display data to be displayed in the adjoining non-display regions of the liquid crystal panels 102-1, 102-2, 102-3 and 102-4 is not captured as partial display data by the multi-display interfaces 101 to correct the display data to be displayed on the liquid crystal displays 102, the sloping curve shown in FIG. 8 looks continuous. Thus, the image displayed so as to look as though an outside scenery is seen through the windowpanes of a window sash provided with sash bars.

Figure 9:
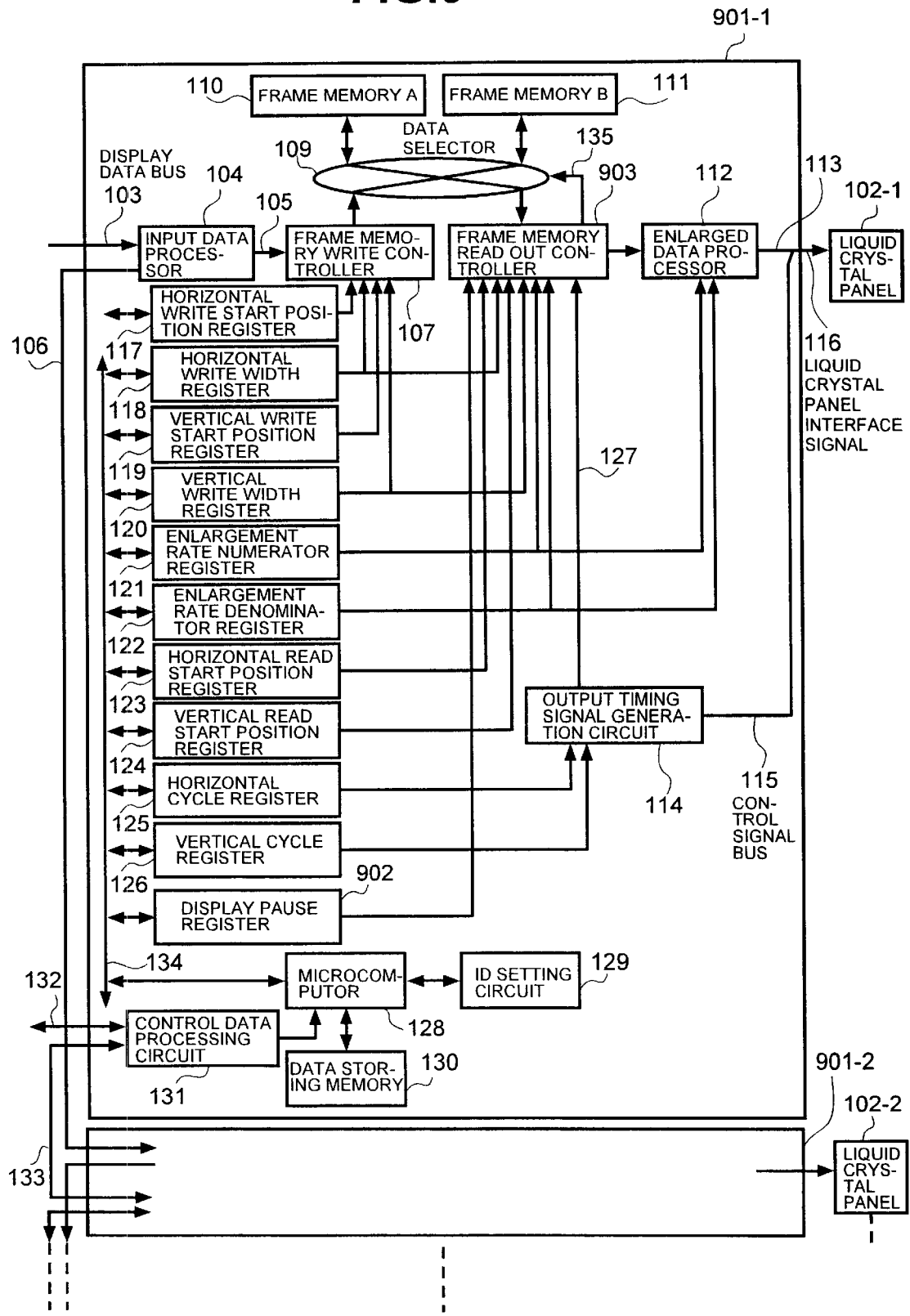
FIG. 9 is a block diagram of a multi-display.

A multi-display in a second embodiment according to the present invention will be described with reference to FIGS. 9, 10 and 11. FIG. 9 is a block diagram of the multi-display, FIGS. 10(*a*), 10(*b*) and 10(*c*) are pictorial views of display data format received from an external system, and FIGS. 11(*a*) and 11(*b*) are pictorial views of an image displayed in a second displaying mode.

As shown in FIG. 9, the multi-display has multi-display interfaces 901 each provided with a display pause register 902 that specifies only a frame memory A 110 or a frame memory B 111 for a frame memory from which display data is to be read, and a frame memory read controller 903 that reflects a value set in the display pause register 902. The multi-display in the second embodiment is similar in other respects to the multi-display in the first embodiment and hence the description of parts like or corresponding to those of the multi-display in the first embodiment will be omitted.

Referring to FIG. 9, the display pause register 902 specifies the frame memory A 110 or the frame memory B 111 as a frame memory from which the display data is to be read by the frame memory read controller 903. If a value specifying the frame memory A 110 is set in the display pause register 902, the frame memory read controller 903 continues reading display data only from the frame memory A 110 for each frame, and the frame memory write controller 107 continues writing the display data transferred through the display data buses 103 and 105 only to the frame memory B 111.

Similarly, if a value specifying the frame memory B 111 is set in the display pause register 902, the frame memory read controller 903 continues reading display data only from the frame memory B 111 for each frame, and the frame memory write controller 107 continues writing the display data transferred through the display data buses 103 and 105 only to the frame memory A 110. Accordingly, the display data to be displayed on the liquid crystal panel 102 is not updated even if new display data is transferred through the display data buses 103 and 105 when the frame memory from which the display data is to be read is specified.

When the set value set in the display pause register 902 to specify the frame memory from which the display data is to be read is canceled, the frame memory read controller 903 reads the display data alternately from the frame memory A 110 and the frame memory B 111, and the frame memory write controller 107 writes the display data alternately to the frame memory A 110 and the frame memory B 111, so that the display data to be displayed on the liquid crystal panel 102 can be updated.

Those operations will be described in terms of a case where images shown in FIGS. 10(*a*) to 10(*c*) are displayed in display modes shown in FIGS. 11(*a*) and 11(*b*) by the multi-display.

FIGS. 10(*a*) to 10(*c*) show display data formats transferred through the display data bus 103 from the external system. In FIG. 10(*a*), reference numerals 301 and 302, similarly those shown in FIG. 3, indicate effective display data included in the display data transferred to the multi-display interface 901 and display data for one frame including non-display data, respectively.

Similarly, in FIG. 10(*b*), reference numerals 1001 and 1002 indicate effective display data included in the display data transferred to the multi-display interface 901 and display data for one frame including non-display data, respectively. Similarly, in FIG. 10(*c*), reference numerals 1003 and 1004 indicate effective display data included in the display data transferred to the multi-display interface 901 and display data for one frame including non-display data.

Figure 10A:
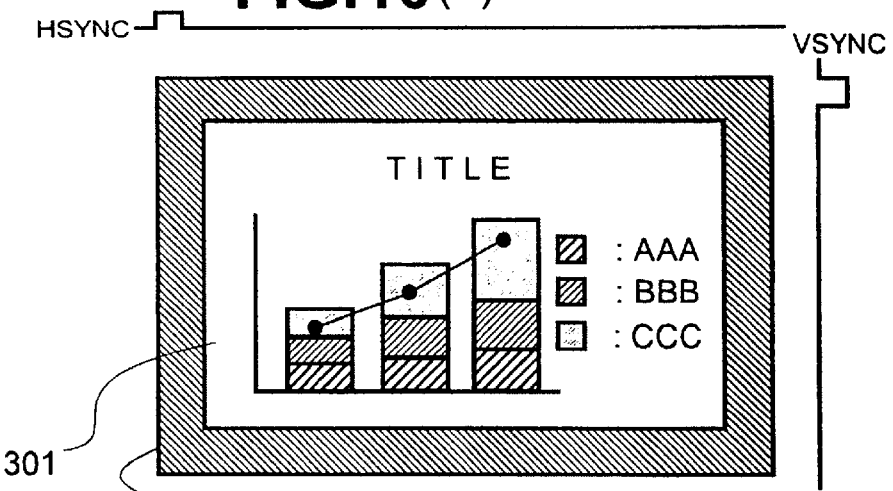
FIGS. 10(a), 10(b) and 10(c) are pictorial views of assistance in explaining an input display data format.
Figure 10B:
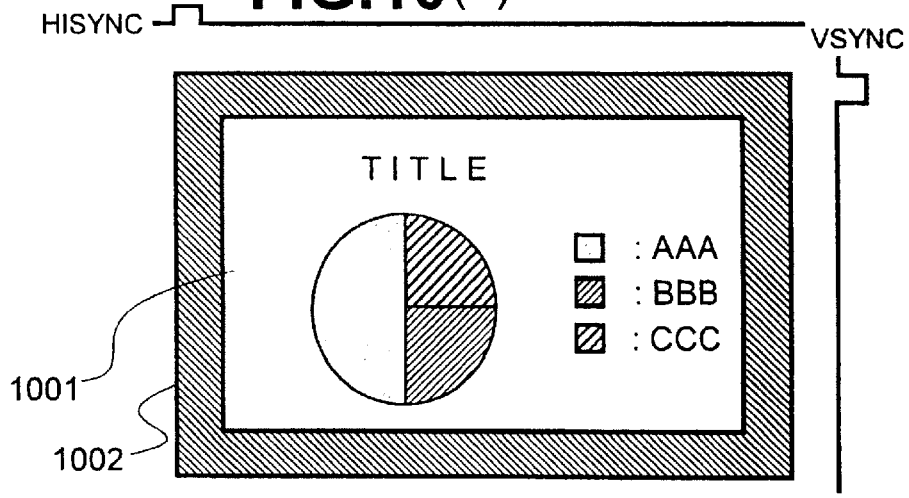
Figure 10C:
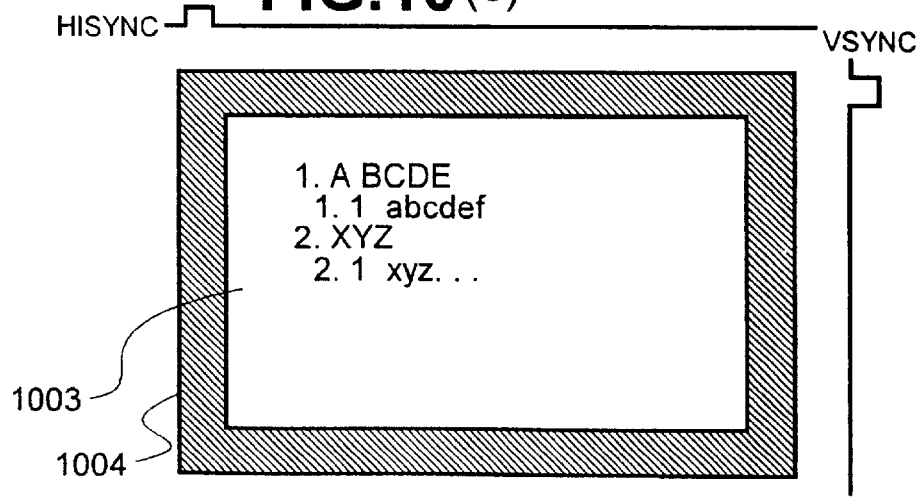
Figure 11:
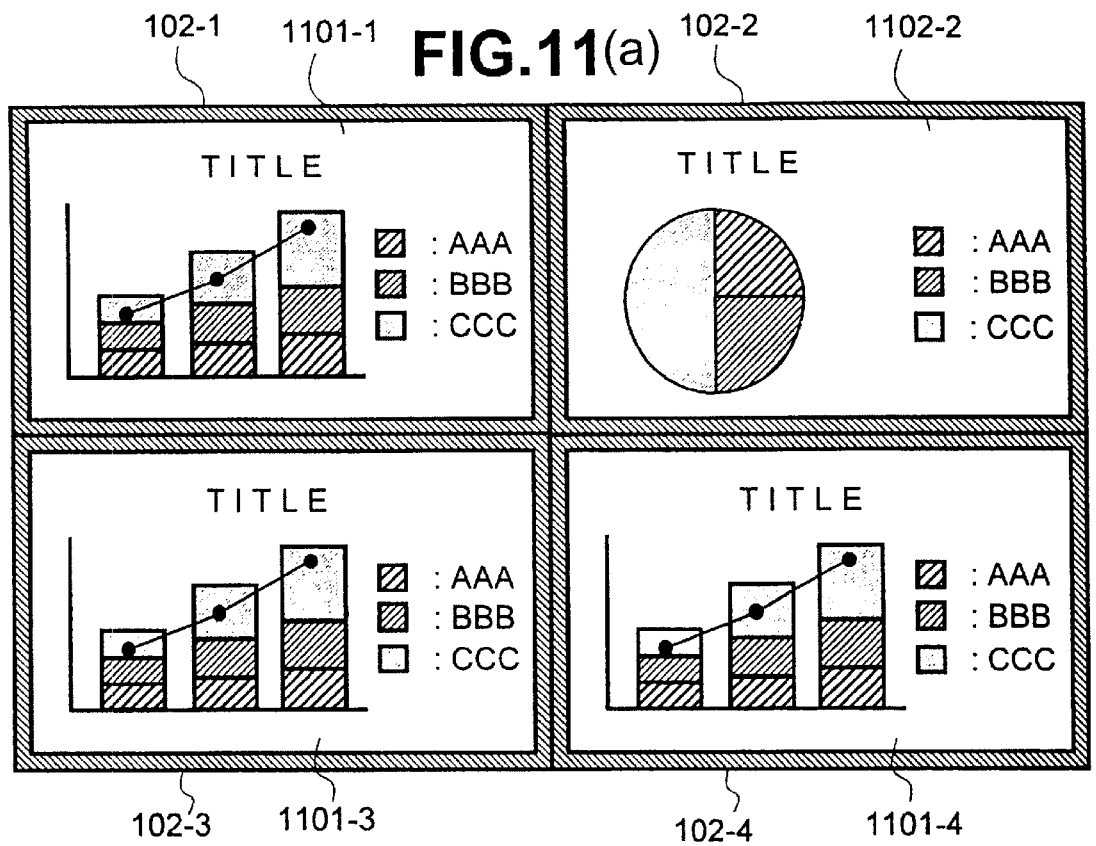
FIGS. 11(a) and 11(b) are pictorial views of assistance in explaining another mode of displaying images.
Figure 11:
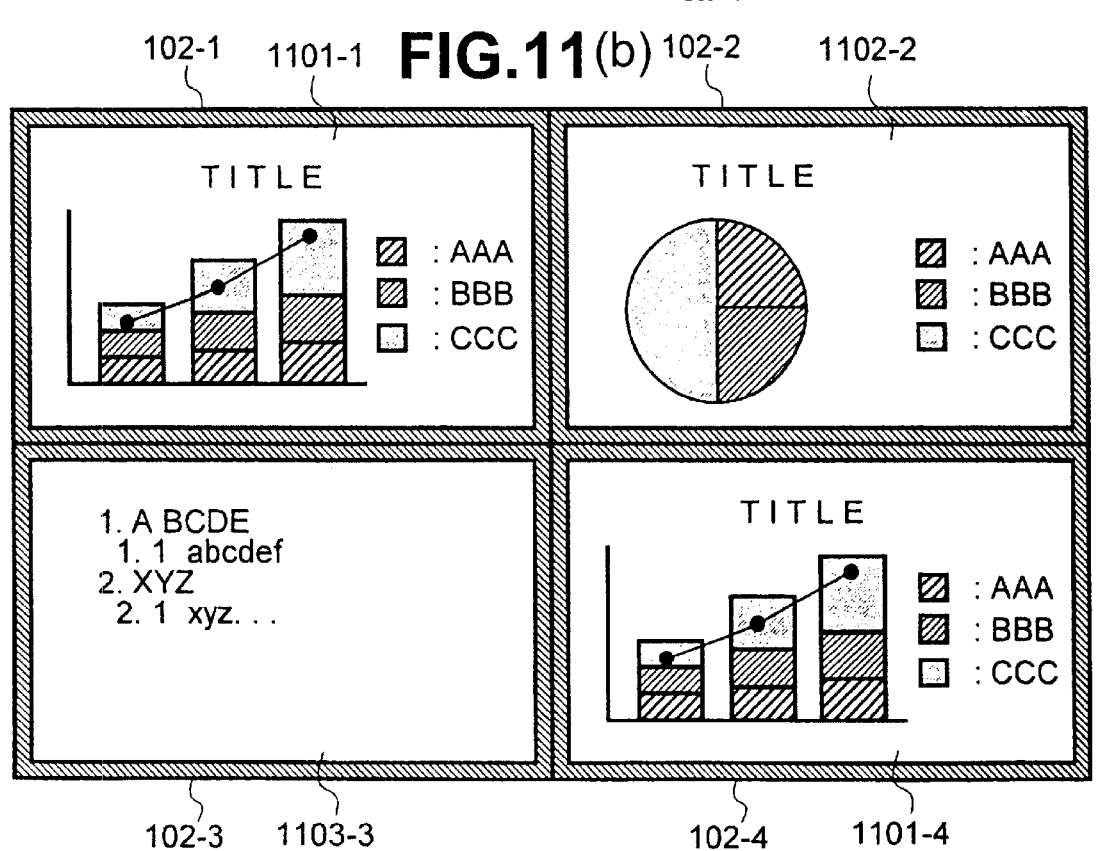

Referring to FIGS. 11(*a*) and 11(*b*), indicated at 1101-1, 1101-3, 1101-4 are images represented by the display data shown in FIG. 10(*a*), indicated at 1102-2 is an image represented by the display data shown in FIG. 10(*b*) and indicated at 1103-3 is an image represented by the display data shown in FIG. 10(*c*).

First the display data 302 shown in FIG. 10(*a*) is transferred through the display data buses 103 and 105. All the liquid crystal displays 102 with the ID numbers 1, 2, 3 and 4 display the effective display data 301 shown in FIG. 10(*a*) in a display mode similar to that shown in FIG. 4. Display pause commands are given through the control bus 132 to the multi-display interfaces 901 identified respectively by ID numbers 1, 3 and 4 connected to the liquid crystal panels 102-1, 102-3 and 102-4, respectively.

The microcomputer 128 of each multi-display interface 901 compares an ID number included in the display pause command with the ID number set in the ID setting circuit 129 and, when those ID numbers coincide with each other, the microcomputer 128 sets display pause data in the display pause register 902. Consequently, frame memories from which display data is to be read by the frame memory read controller 903 of the multi-display interfaces 901 identified by the ID numbers 1, 3 and 4 are determined.

Consequently, the display data 1101-1, 1101-3 and 1101-4 represented by the effective display data 301 in FIG. 10(*a*) are displayed fixedly on the liquid crystal panels 102-1, 102-3 and 102-4.

Subsequently, the display data 1002 shown in FIG. 10(*b*) is transferred through the display data buses 103 and 105.

Then, only the liquid crystal panel 102-2 not in a display pause state displays display data 1102-2 represented by the effective display data 1001 as shown in FIG. 11(a).

Then, a display pause command is transferred through the control bus 132 to the multi-display interface 901 identified by the ID number 2 and connected to the liquid crystal panel 102-2. The microcomputer 128 of the multi-display interface 901 compares an ID number included in the display pause command with the ID number set in the ID setting circuit 129 and, when those ID numbers coincide with each other, the microcomputer 128 sets display pause data in the display pause register 902. Consequently, a frame memory from which display data is to be read by the frame memory read controller 903 of the multi-display interface 901 identified by the ID number 2 is determined.

Consequently, the display data 1101-1 and 1101-4 corresponding to the effective display data 301 shown in FIG. 10(a) are displayed fixedly on the liquid crystal panels 102-1 and 102-4, and the display data 1102-2 corresponding to the effective display data 1001 shown in FIG. 10(b) is displayed fixedly on the liquid crystal panel 1102-2.

A display pause cancellation command is transferred through the control bus 132 to the multi-display interface 901 identified by the ID number 3 and connected to the liquid crystal panel 102-3. The microcomputer 128 of the multi-display interface 901 compares an ID number included in the display pause cancellation command and an ID number set by the ID setting circuit 129, and display pause data set in the display pause resister 902 is cancelled when those ID numbers coincide with each other.

Consequently, the display data stored in the frame memory of the multi-display interface 901 identified by the ID number 3 is updated; that is, when the effective display data 1003 shown in FIG. 10(c) is transferred through the display data buses 103 and 105, only the liquid crystal panel 102-3 not in a display pause state displays display data 1103-3 corresponding to the effective display data 1003 shown in FIG. 10(c) as shown in FIG. 11(b).

Thus the multi-display in the second embodiment is capable of the display pause function and of displaying a plurality of different display data without requiring display data buses respectively for the liquid crystal panels.

Although the multi-display in the second embodiment has been described on an assumption that the same values are set in the horizontal write start position register 117, the horizontal write width register 118, the vertical write start position register 119, the vertical write width register 120, the enlargement rate numerator register 121 and the enlargement rate denominator register 122 for all the liquid crystal panels 102 identified by the ID numbers as illustrated by FIGS. 3 and 4, it goes without saying that various combinations of different values, such as the combination of FIGS. 5 and 6, may be used to display variable images.

A multi-display in a third embodiment according to the present invention will be described with reference to FIGS. 12, 13 and 14.

Figure 12:
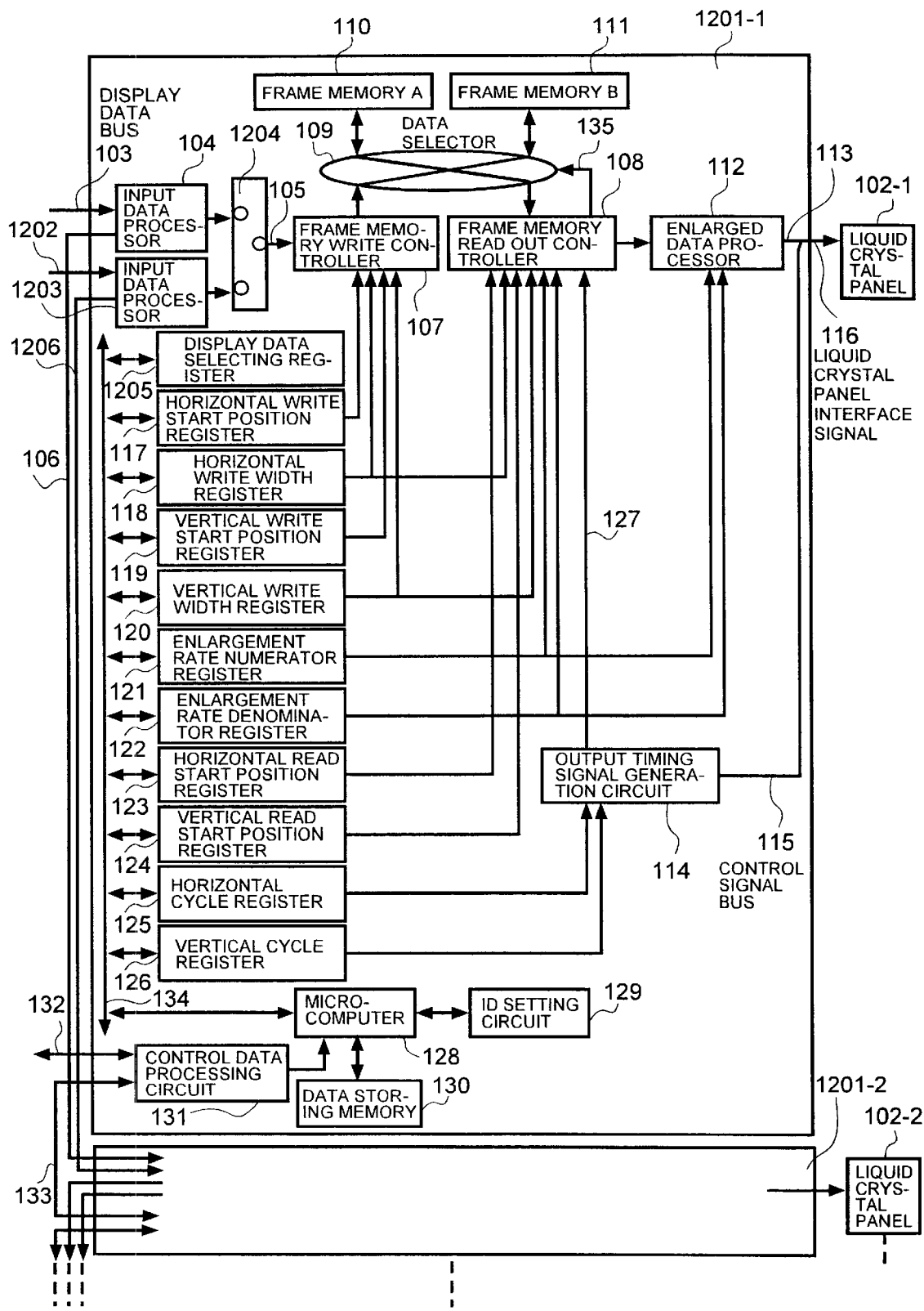
FIG. 12 is a block diagram of a multi-display.
Figure 13A:
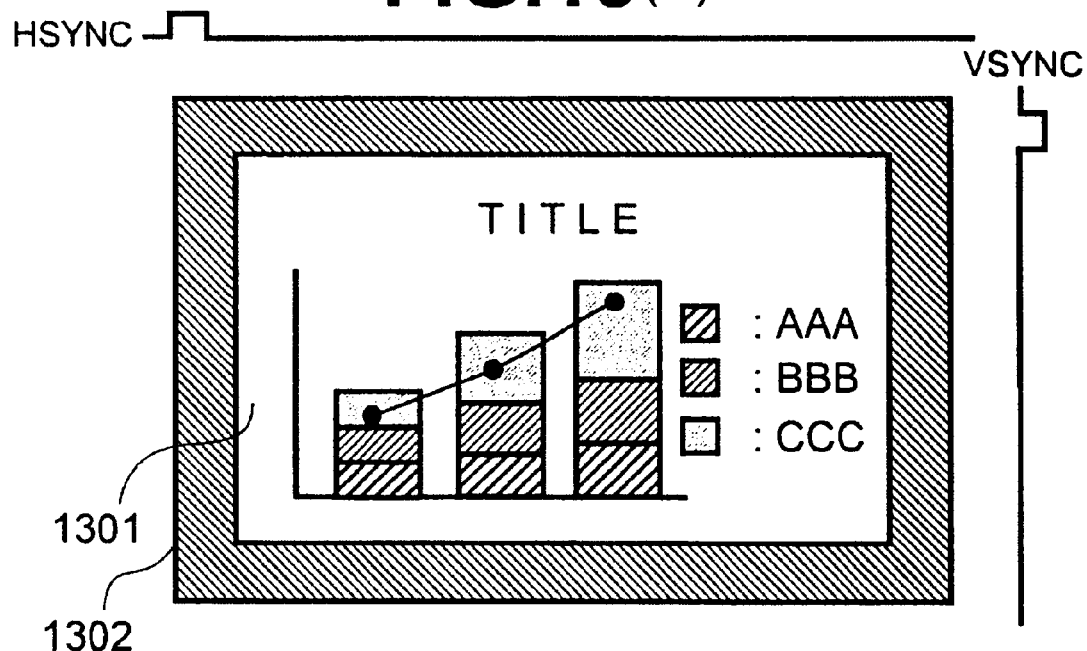
FIGS. 13(a) and 13(b) are pictorial views of assistance in explaining an image display data format.
Figure 13B:
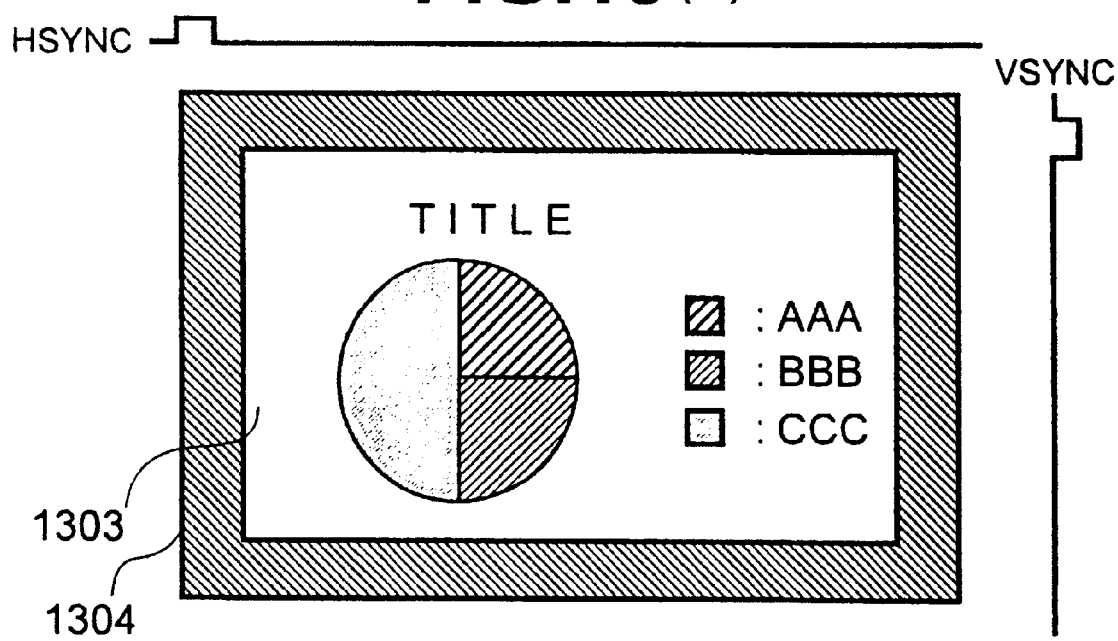
Figure 14:
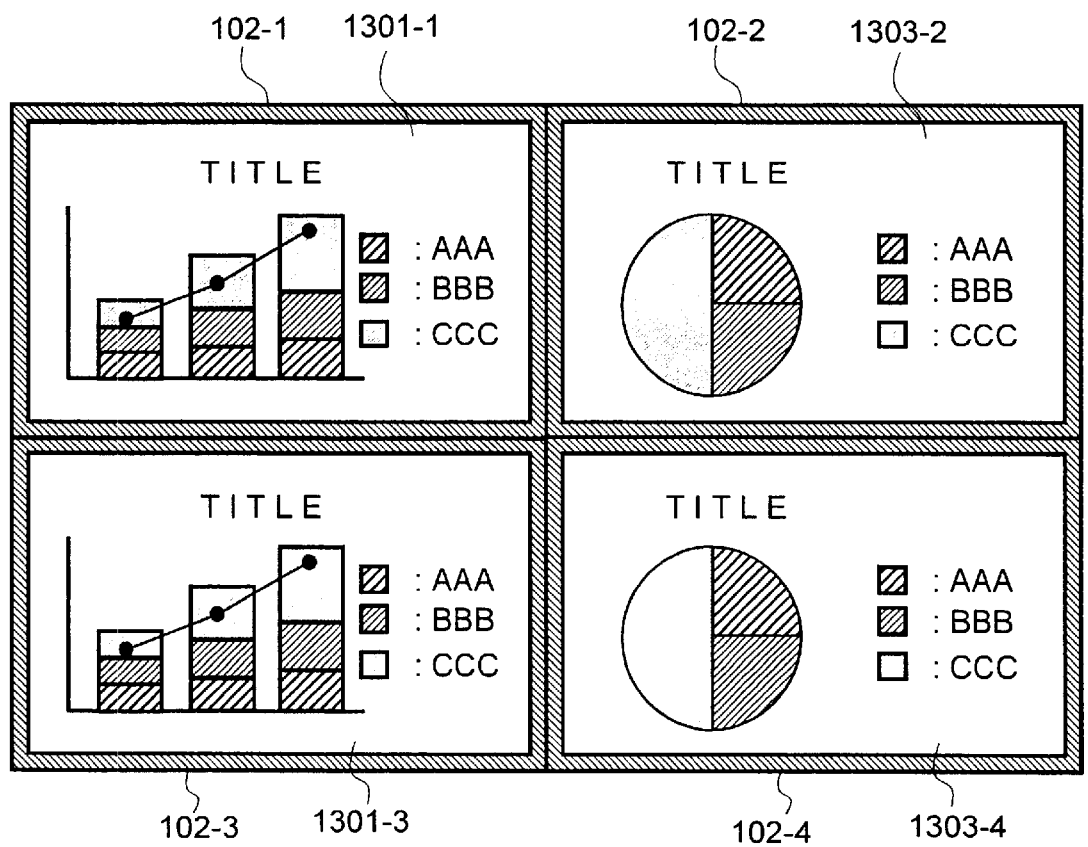
FIG. 14 is a pictorial views of assistance in explaining a mode of displayed images.

FIG. 12 is a block diagram of the multi-display in the third embodiment, FIG. 13 shows display data formats transferred from an external system to the multi-display, and FIG. 14 shows images displayed by the multi-display.

Shown in FIG. 12 are multi-display interfaces 1201, a display data bus 1202 through which display data is transferred, an input data processor 1203 that processes display data transferred through the display data bus 1202, an input display data selecting register 1205, and a display data bus 1206 for transferring display data to the next multi-display interface 1201. The multi-display in the third embodiment is similar in other respects to the multi-display in the first embodiment shown in FIG. 1 and hence the description of parts like or corresponding to those of the multi-display in the first embodiment will be omitted.

FIG. 13(a) shows a display data format transferred through the display data bus 103 and FIG. 13(b) shows a display data format transferred through the display data bus 1202. In the display data format shown in FIG. 13(a), indicated at 1301 is an effective display data included in the display data transferred through the display data bus 103 and at 1302 is display data for one frame including non-display data. Similarly, in the display data format shown in FIG. 13(b), indicated at 1303 is an effective display data included in the display data transferred through the display data bus 1202 and at 1304 is display data for one frame including non-display data.

Referring to FIG. 14, the display data 1301 shown in FIG. 13(a) is displayed on the liquid crystal panels 102-1 and 102-3, and the display data 1303 shown in FIG. 13(b) is displayed on the liquid crystal displays 102-2 and 102-4.

The operation of the multi-display will be described hereinafter. Referring to FIG. 9, the display data selecting register 1205 selects either the display data transferred through the display data bus 103 or the display data transferred through the display data bus 1202. When the display data transferred through the display data bus 103 is selected by the display data selecting register 1205, the effective display data 1301 shown in FIG. 13(a) is written to the frame memory A 110 or the frame memory B 111, and the effective display data 1301 is read from the frame memory A 110 or the frame memory B 111 and is displayed on the liquid crystal panel 102. When the display data transferred through the display data bus 1202 is selected by the display data selecting register 1205, the effective display data 1303 shown in FIG. 13(b) is written to the frame memory A 110 or the frame memory B 111, and the effective display data 1303 is read from the frame memory A 110 or the frame memory B 111 and is displayed on the liquid crystal panel 102. Thus, the display data to be displayed on the liquid crystal display 102 can selectively determined, which will be described with reference to FIGS. 13 and 14.

The display data 1302 shown in FIG. 13(a) is transferred through the display data bus 103 and the display data 1304 shown in FIG. 13(b) is transferred through the display data bus 1202. As shown in FIG. 14, the display data selecting registers 1205 of the multi-display interfaces 1201 connected to the liquid crystal panels 102-1 and 102-3 identified respectively by the ID numbers 1 and 3 select the display data 1302 shown in FIG. 13(a) and transferred through the display data bus 103.

Similarly, the display data selecting registers 1205 of the multi-display interfaces 1201 connected to the liquid crystal panels 102-2 and 102-4 identified respectively by the ID numbers 2 and 4 select the display data 1304 shown in FIG. 13(b) and transferred through the display data bus 1202.

As mentioned above, the microcomputer 128 compares an ID number specifying the liquid crystal panel 102 and included in a command given thereto through the control bus 132 with an ID number set by the ID setting circuit 129 to select the relevant display data bus for the control of a display data selecting operation.

Since the multi-display is capable of a display data bus selecting function, different effective display data received from different display data sources can be displayed on the liquid crystal panels 102, respectively. Although the multi-display in the third embodiment has been described on an assumption that the same values are set in the horizontal write start position register 117, the horizontal write width register 118, the vertical write start position register 119, the vertical write width register 120, the enlargement rate numerator register 121 and the enlargement rate denominator register 122 for all the liquid crystal panels 102 identified by the ID numbers as illustrated by FIGS. 3 and 4, it goes without saying that various combinations of different values, such as the combination of FIGS. 5 and 6, may be used to display variable images.

Needless to say, the multi-display may additionally be provided with the display pause function to display variable images.

Although the multi-display described above is provided with the four liquid crystal panels 102, it need scarcely be said that the multi-display may be provided with more than four liquid crystal panels arranged in an M×N rectangular array (M and N are integers excluding zero). The multi-display interface 1201 may be provided with two or more display data buses 1202 and two or more input data processors 1203.

Figure 15:
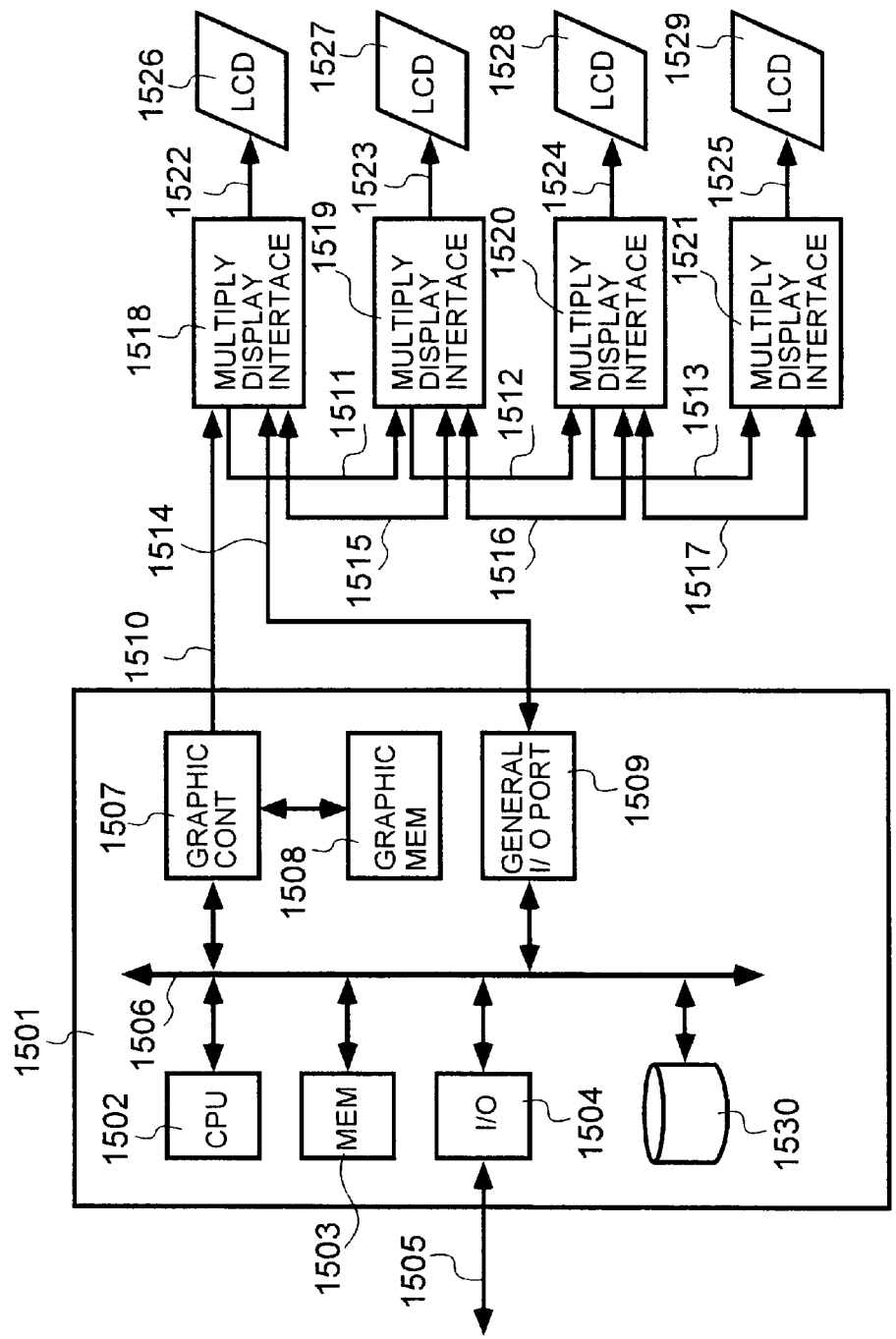
FIG. 15 is a block diagram of a multi-display system embodying the present invention.

A multi-display system in a fourth embodiment according to the present invention will be described with reference to FIG. 15 showing the multi-display system comprising a multi-display provided with four display devices, and a controller 1501, which is a personal computer in this embodiment.

Shown in FIG. 15 are the controller 1501, a central processing unit 1502 that realizes various operating functions, a main memory 1503 storing programs; a network I/O unit 1504, a network 1505 that exchanges signals with external systems, a system bus 1506, a graphic controller 1507, a graphic memory 1508 to which the graphic controller 1507 writes display data and from which the same reads display data and sends the display data to external liquid crystal multi-display, a general I/O port 1509 through which commands are transferred to the liquid crystal multi-display, a display data bus 1510, which corresponds to the display data bus 103 shown in FIG. 1, display data buses 1511, 1512 and 1513 for daisy chain connection, which correspond to the data buses 106 shown in FIG. 1, a control signal bus 1514, which corresponds to the control signal bus 132 shown in FIG. 1, and control signal buses 1515, 1516 and 1517 for daisy chain connection, which correspond to the control signal buses 133.

Shown also in FIG. 15 are multi-display interfaces 1518, 1519, 1520 and 1521, which correspond to the multi-display interfaces 101 shown in FIG. 1, display data buses 1523, 1524 and 1525, which correspond to the display data bus 116 shown in FIG. 1, liquid crystal panels 1526, 1527, 1528 and 1529, which correspond to the liquid crystal panel 102 shown in FIG. 1, and a storage device 1530.

The operation of the multi-display system in the fourth embodiment will be described with reference to FIG. 15. Display data to be displayed on the liquid crystal panels 1526 to 1529 is transferred through the network 1505 and is stored in the storage device 1530.

The central processing unit 1502 sends the display data stored in the storage device 1530 through the graphic controller 1507 and writes the same to the graphic memory 1508 in accordance with a program stored in the main memory 1503. The graphic controller 1507 reads the display data from the graphic memory 1508 and sends the same out on the display data bus 1510.

The central processing unit 1502 sends out control data through the general I/O port 1509 on the control signal bus 1514 according to the program stored in the main memory 1503. The multi-display interfaces 1518 to 1521 make the liquid crystal panels 1526 to 1529 display the display data of various formats transferred through the display data bus 1510 according to control data transferred through the control signal bus 1514.

The control data includes information to be given to the controller and specifying the display data to be given to the multi-display, i.e., partial display data. Information about the arrangement of the displays of the multi-display provided with the displays arranged in an M×N rectangular array, such as ID numbers identifying the displays, is added to the control data.

These pieces of information included in the control data are stored in the storage device of an information processor. Proper control data is produced according to programs by using input data received from external systems, and the control data is sent to the controller.

Thus, the single controller 1501 can simultaneously control the plurality of display devices, i.e., the liquid crystal panels 1526 to 1529.

Figure 16:
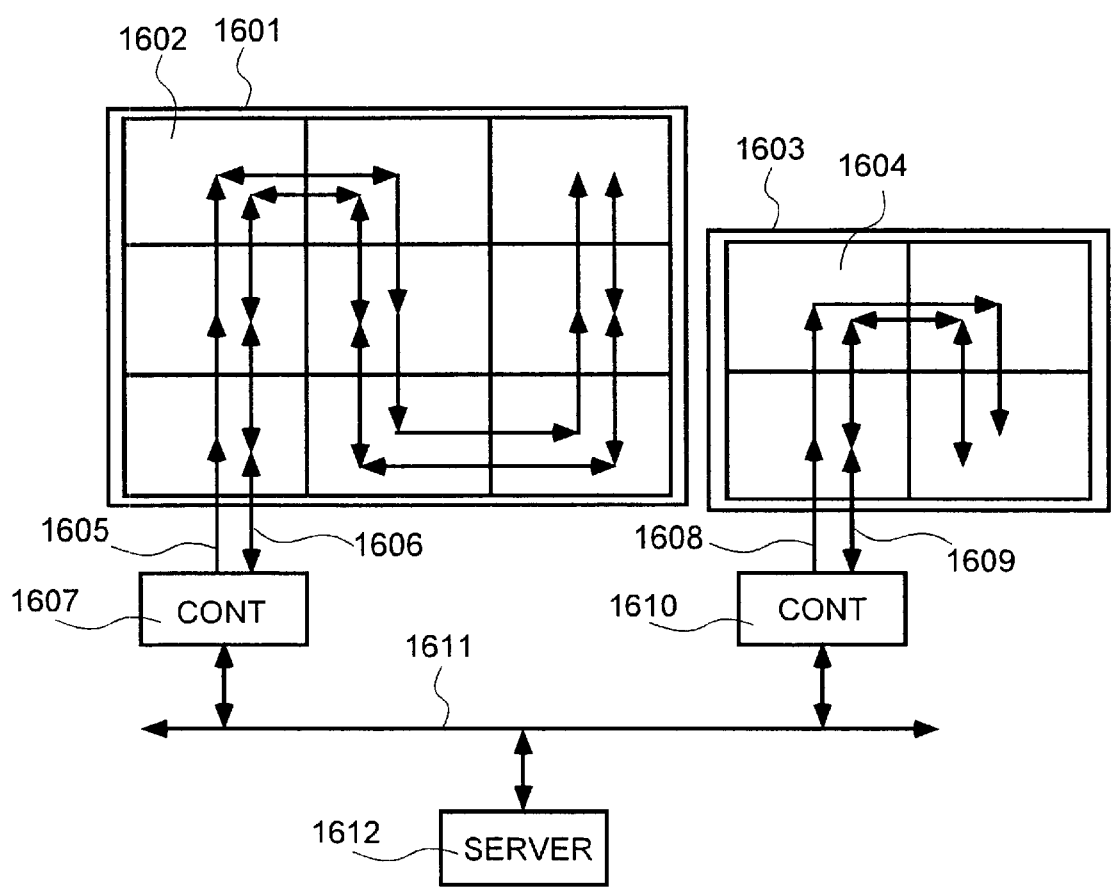
FIG. 16 is a block diagram of a multi-display system comprising a plurality of multi-displays embodying the present invention.

A multi-display system in a fifth embodiment according to the present invention will be described with reference to FIG. 16. The multi-display system comprises two multi-displays in accordance with the present invention. Referring to FIG. 16, a first multi-display 1601 has nine liquid crystal panels. A display unit 1602 comprises the liquid crystal panels and a multi-display interface. A second multi-display 1603 has four liquid crystal panels. A display unit 1604 comprises the liquid crystal panels and a multi-display interface. The display unit 1602 and the display unit 1604 may differ from each other in resolution.

Display data is transferred to the first multi-display 1601 through a display data bus 1605, which corresponds to the display data bus 103 shown in FIG. 1. Control data including commands is transferred through a control signal bus 1606, which corresponds to the control signal bus 132 shown in FIG. 1. A controller 1607 may be a personal computer or the like. Display data is transferred to the second multi-display 1603 through a display data bus 1608, which corresponds to the display data bus 103 shown in FIG. 1. Control data including commands is transferred through a control signal bus 1609, which corresponds to the control signal bus 132 shown in FIG. 1. A controller 1610 may be a personal computer or the like. The display data bus 1605 and the control signal bus 1606 are connected to the components of the first multi-display 1601 by a daisy chain configuration, and the display data bus 1608 and the control signal bus 1609 are connected to the components of the second multi-display 1603 by a daisy chain configuration. Shown also in FIG. 16 are a network bus 1611 and a server 1612.

In operation, display data to be displayed by the first multi-display 1601 and the second multi-display 1603 are transferred beforehand or periodically from the server 1612 through the network bus 1611 to the controllers 1607 and 1610. The controllers 1607 and 1610 send out the display data given thereto on the display buses 1605 and 1608. Commands associated with the display data are transferred through the control buses 1606 and 1609 to the multi-displays 1601 and 1603, respectively.

Each of the controllers 1607 and 1610 is able to control the plurality of liquid crystal panels simultaneously, and enlarged images corresponding to the sizes of the multi-displays 1601 and 1603 can be displayed. The display data buses 1605 and 1608 and the control signal buses 1606 and 1609 may be connected to the component devices of the multi-displays 1601 and 1603 by any suitable connecting configuration other than the daisy chain configuration.

Figure 17:
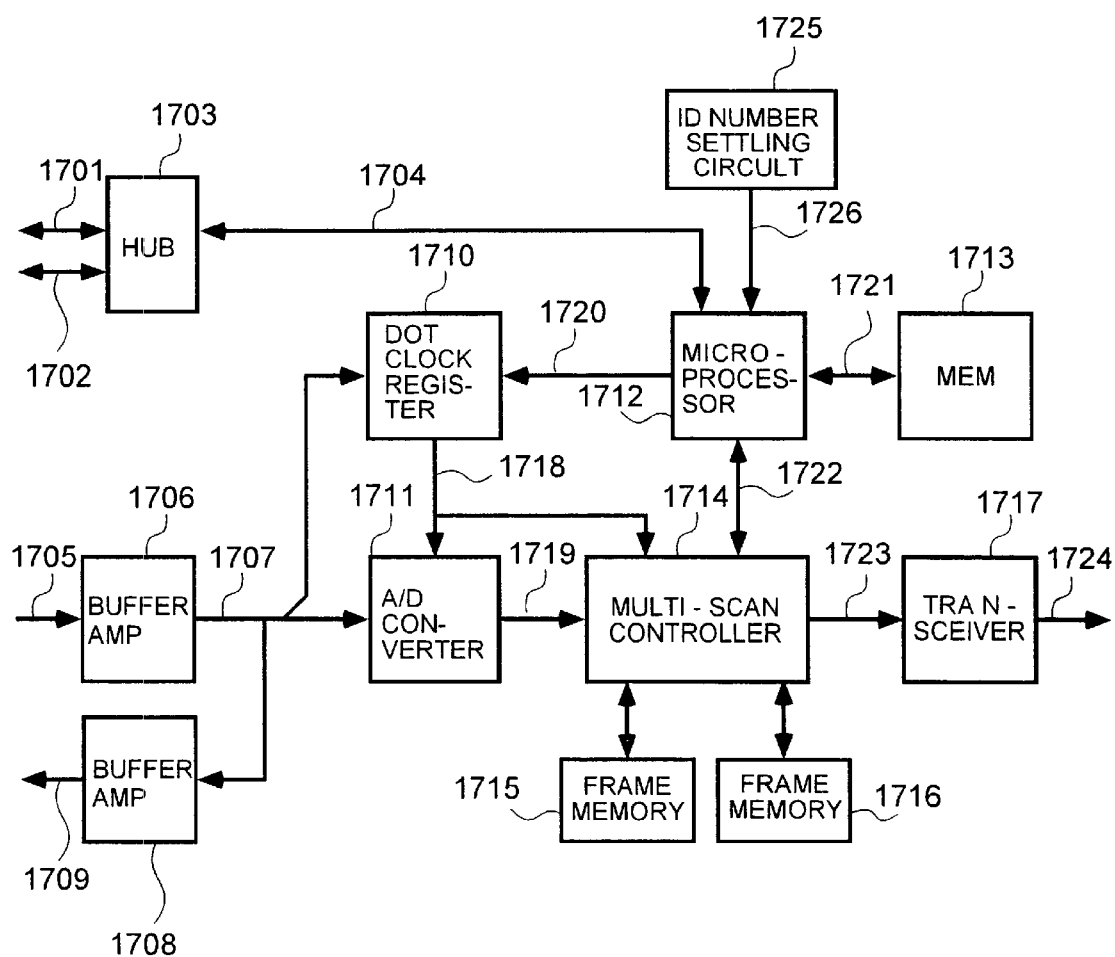
FIG. 17 is a block diagram of an interface.

A multi-display interface in a sixth embodiment according to the present invention will be described with reference to FIG. 17. FIG. 17 is a block diagram of the multi-display interface formed on a board. The multi-display interface receives an analog signal for CRT (cathode-ray tube) interfacing.

Indicated at 1701, 1702 and 1704 are control buses, and at 1703 is a hub. This corresponds to the control data processor shown in FIG. 1. Analog display data is transferred through display data buses 1705, 1707 and 1709. The analog display data includes digital horizontal and vertical synchronizing signals. Indicated at 1706 and 1708 are buffer amplifiers. Indicated at 1710 is a dot clock regenerator. Since CRT interface does not transfer a dot clock synchronous with the display data, a horizontal synchronizing signal must be received and a dot clock must be regenerated.

An A/D converter 1711 converts the analog display data into corresponding digital display data. Shown also in FIG. 17 are a microcomputer 1712, a memory 1713 and a multi-scan controller 1714 which is provided with various registers as shown in FIG. 1. Shown also in FIG. 17 are frame memories 1715 and 1716, a transceiver 1717, a dot clock 1718 that provides a clock signal which is used as a sampling clock for the A/D converter 1711 and an operation clock for the multi-scan controller 1714.

Digital display data produced by the analog-to-digital conversion by the A/D converter 1711 is transferred through a display data bus 1719. The microcomputer 1712 transfers set values through a control bus 1720 to the dot clock regenerator 1710. Data is exchanged through a data bus 1721 between the microcomputer 1712 and the memory 1713. Data is exchanged through a data bus 1722 between the microcomputer 1712 and the multi-scan controller 1714. Display data provided by the multi-scan controller 1714 and the synchronizing signals are transmitted through a display data bus 1723. Display data provided by the transceiver 1717 and the synchronizing signals are transferred through a display data bus 1724. Indicated at 1725 is an ID number setting circuit and at 1726 is a data bus through which ID numbers are transferred to the microcomputer 1712.

In operation, analog display data and synchronizing signals are transferred through the display data bus 1705. The buffer amplifier 1706 amplifies the analog display data and the amplified analog display data is given to the A/D converter 1711.

The synchronizing signals are transferred through the buffer amplifier 1706 to the dot clock regenerator 1710 and the dot clock regenerator 1710 regenerates a dot clock. The dot clock regenerator 1710 may be a phase locked loop circuit or the like. The A/D converter 1711 gives digital display data to the multi-scan controller 1714 and is stored in the frame memories 1715 and 1716. The multi-scan controller 1714 reads the display data from the frame memories 1715 and 1716 and sends the display data through the display data bus 1724 to the liquid crystal panel.

Since the multi-scan controller 1714 is provided with the registers as shown in FIG. 1, the microcomputer 1712 sets values in the registers according to commands included in the control data transferred thereto through the control signal bus 1704 to display images in various display formats. The display data is transferred through the buffer amplifier 1708 to the next multi-display interface, and control data is transferred to the next multi-display interface through the hub 1703.

A multi-display can be constructed by assembling combinations each of the multi-display interface in the sixth embodiment and a liquid crystal panel. The foregoing functions can be achieved by an integrated circuit.

Figure 18:
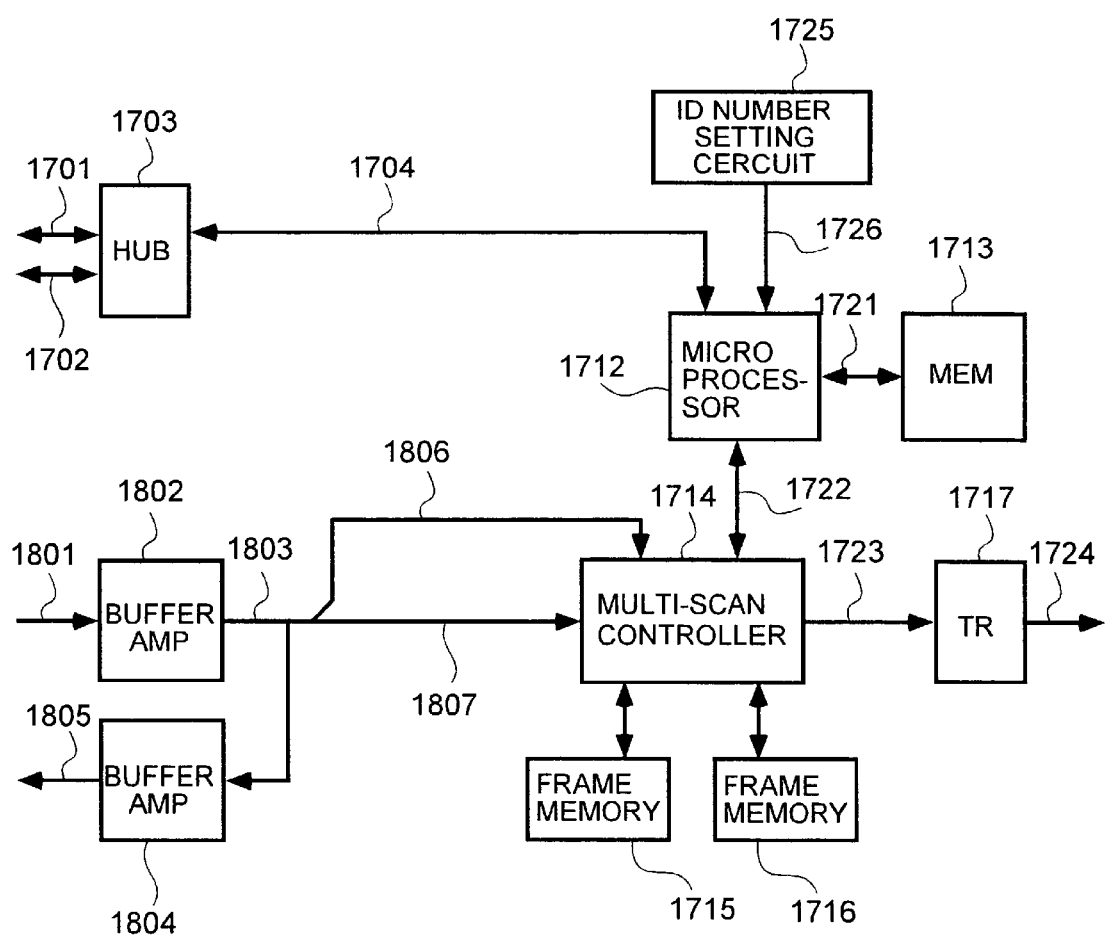
FIG. 18 is a block diagram of another interface.

A multi-display interface in a seventh embodiment according to the present invention will be described with reference to FIG. 18. FIG. 18 is a block diagram of the multi-display interface formed on a board. The multi-display interface receives directly a digital display signal. Shown in FIG. 18 are a display data bus 1801, a receiver 1802, a display data bus 1803, a transceiver 1804 and a display data bus 1805. Digital display data, a horizontal synchronizing signal, a vertical synchronizing signal, a display effective signal and a dot clock are transferred through the display data buses 1801, 1803 and 1805. Indicated at 1806 is a dot clock and at 1807 is a digital display data.

The multi-display interface in the seventh embodiment does not need any component corresponding to the A/D converter 1711 shown in FIG. 17 because, in the seventh embodiment, the digital display data, the horizontal synchronizing signal, the vertical synchronizing signal, the display effective signal and the dot clock are transferred through the display data bus 1801. The display data is transferred to the next multi-display interface by the transceiver 1804.

Other operations of the multi-display interface in the seventh embodiment are the same as those of the multi-display interface shown in FIG. 17 and hence further description of the operations of the multi-display interface in the seventh embodiment will be omitted. The multi-display interface thus constructed can be applied to a system that transfers digital display data.

Figure 19:
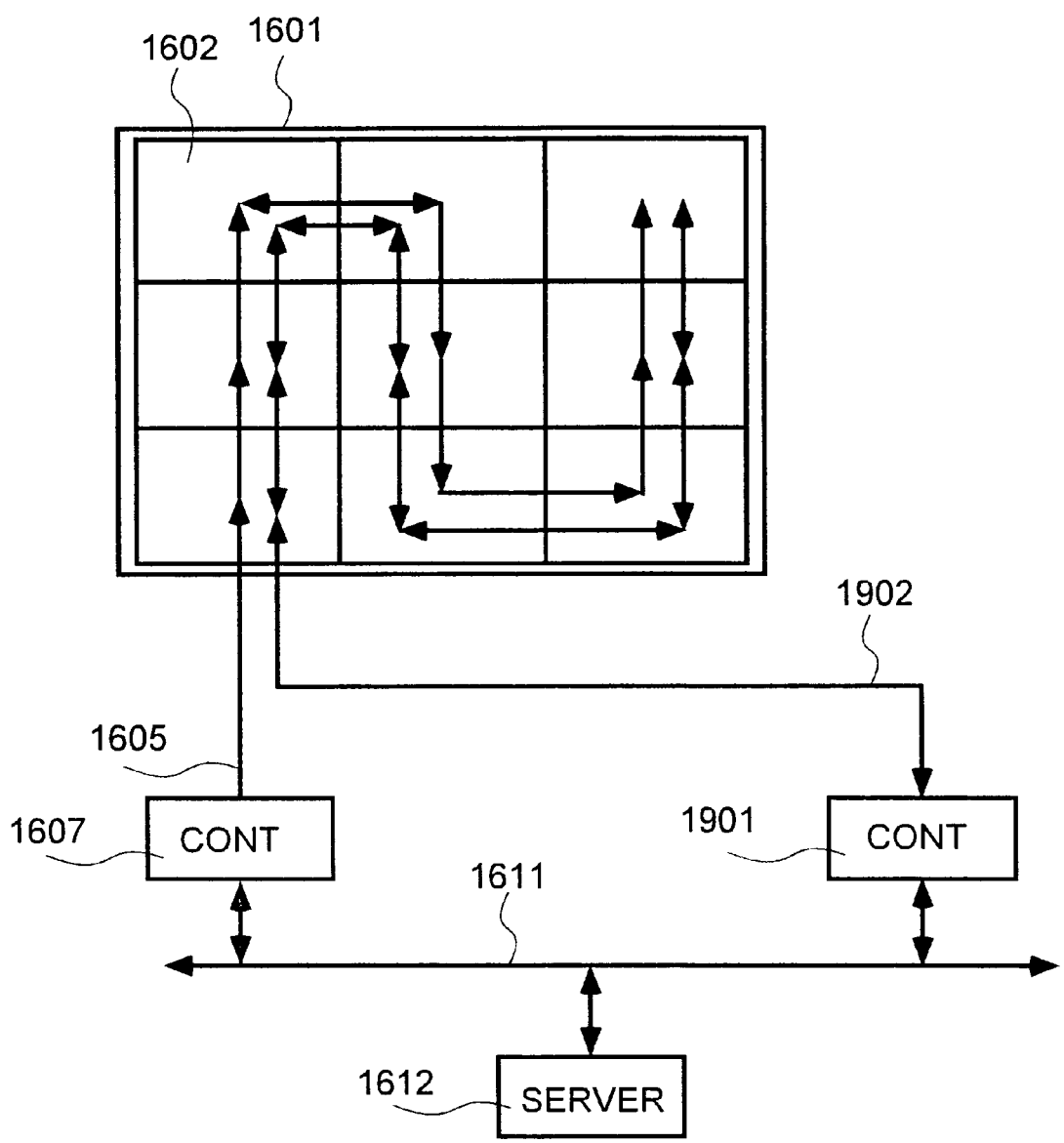
FIG. 19 is a multi-display system in another embodiment according to the present invention.

A multi-display system in an eighth embodiment according to the present invention will be described with reference to FIG. 19. The multi-display system comprises a multi-display in accordance with the present invention. A controller 1901 may comprise a personal computer or the like. Control data including commands is transferred through a control signal bus 1902.

In this embodiment, display data and control data are provided by separate controllers. Display data to be displayed by a multi-display 1601 is transferred beforehand or periodically from a server 1612 through a network bus 1611 to a controller 1607. Control data is transferred from a controller 1901 to the multi-display 1601.

Thus, the controller that provides control data can be operated in a remote control mode even if the controller that provides display data and the multi-display 1601 are contiguous.

Procedures for executing commands relating to unmagnified display shown in FIG. 4, uncorrected magnified display shown in FIG. 6 and corrected magnified display shown in FIG. 8 will be described with reference to a flow chart shown in FIG. 20. In step 2001, a command given by the controller is transferred through the control signal bus 132 shown in FIG. 1. In step 2002, the command is received. In step 2003, a query is made to see if an ID number included in the command coincides with an ID number identifying the multi-scan interface. In step 2004, a query is made to see if the command requests unmagnified display shown in FIG. 4. In step 2005, a query is made to see if the command requests uncorrected magnified display shown in FIG. 6. In step 2006, a query is made to see if the command request corrected magnified display shown in FIG. 8.

In step 2007, the set values are read from the data storing memory 130. In step 2008, the set values for unmagnified display shown in FIG. 4 are read. In step 2009, set values for uncorrected magnified display shown in FIG. 6 are read. In step 2010, set values for corrected magnified display shown in FIG. 8 are read. Values are set in the registers in step 2011, a setting operation completion signal is given in step 2012, the controller receives the setting operation completion signal through the control signal bus 132 in step 2013, and the procedure is ended in step 2014.

In operation, the multi-display interface examines the command to see if the ID number included in the command identifies the multi-scan interface. If the ID number identifies the multi-scan interface, a query is made to see which one of unmagnified display, uncorrected magnified display and corrected magnified display is requested. The set values for the requested display are read from the data storing memory 130 and the values are set in the registers.

After the completion of operations for setting the set values in the registers, the setting operation completion signal is sent to the controller and the procedure is ended. Thus, an image can be displayed in various display formats in a multi-display mode.

Figure 20:
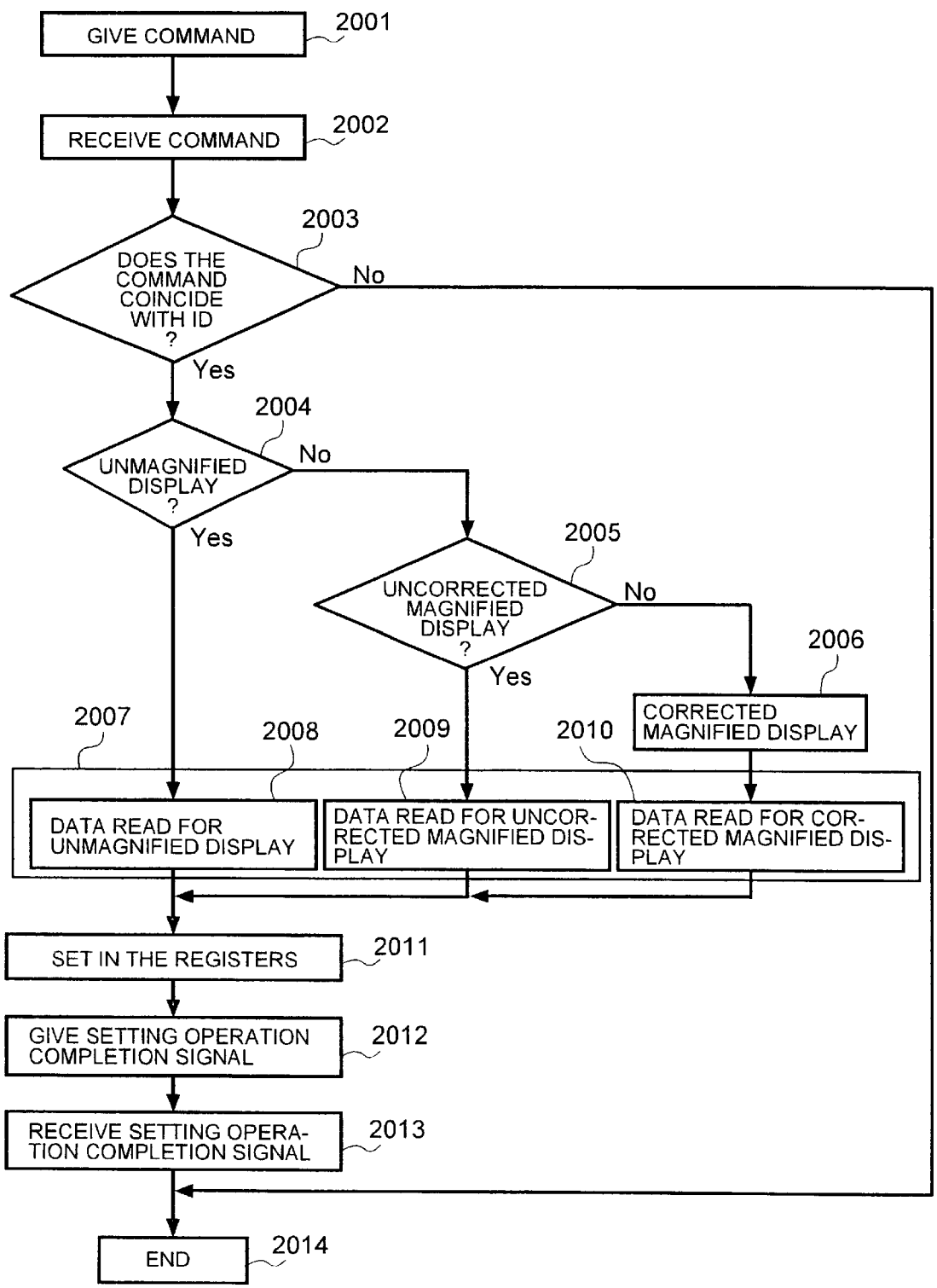
FIG. 20 is a flow chart of a procedure to be carried out by an interface.

The additional functions of the multi-displays shown in FIGS. 9 and 12 can easily be practiced by procedures created by properly adding decision steps to the procedure shown in FIG. 20.

Modifications of the foregoing embodiments of the present invention will be described hereinafter.

A multi-display comprises a plurality of liquid crystal panels, and a plurality of display units that receive display data and display the display data on the liquid crystal panels, wherein each display unit comprises write means for writing display data to a frame memory, a read means for reading the display data from the frame memory, an enlarging means for increasing the display data when reading the display data from the frame memory or after reading the display data from the frame memory, a horizontal write start position specifying means for specifying a horizontal write start position from which an operation for writing the display data to the frame memory is to be started, a horizontal write width specifying means for specifying a horizontal write width in which the display data is to be written to the frame memory, a vertical write start position specifying means for specifying a vertical write start position from which an operation for writing the display data to the frame memory is to be started, a vertical write width specifying means for specifying a vertical write width in which the display data is to be written to the frame memory, an enlargement rate specifying means for specifying an enlargement rate at which the display data from the frame memory is to be magnified, a microcomputers for setting values in those means, an ID number assigned to the display unit, and control signal that transfers commands to the microcomputer.

In the multi-display, the same value is set in the horizontal write start position specifying means of all the display units, the same value is set in the horizontal write width specifying means of all the display units, the same value is set in the vertical write start position specifying means of all the display units, the same value is set in the vertical write width specifying means of all the display units, the same value is set in the enlargement rate specifying means of all the display units, and the same display data is displayed in the same display format by the plurality of display units.

In the multi-display, different values are set in the horizontal write start position specifying means of the display units, different values are set in the horizontal write width specifying means of the display units, different values are set in the vertical write start position specifying means of the display units, different values are set in the vertical write width specifying means of the display units, respectively, to display different regions of the display data by the plurality of display units, respectively.

In the multi-display, the plurality of display units are arranged in a horizontal row, each display unit sets the position of a dot next to the last dot displayed by the preceding display unit in its horizontal write start position specifying means.

In the multi-display, the plurality of display units are arranged in a vertical column, each display unit sets the position of a line next to the last line displayed by the preceding display unit in its vertical write start position specifying means.

In the multi-display, when displaying display data of a resolution lower than that of the liquid crystal panels, an enlargement rate is set in the enlargement rate specifying means for specifying an enlargement rate at which the display data read from the frame memory is to be displayed, to display the display data in an enlarged image.

In the multi-display, when the number of dots corresponding to the width of the right and the left non-display region, or the right or the left non-display region is "a", and the plurality of display units are arranged in a horizontal row, each display unit sets the position of a dot at a distance corresponding to "a" dots from the last dot displayed by the preceding display unit in its horizontal write start position specifying means. In the multi-display, when the number of lines corresponding to the width of the upper and the lower non-display region, or the upper or the lower non-display region is "b", and the plurality of display units are arranged in a vertical column, each display unit sets the position of a line at a distance corresponding to "b" lines from the last line displayed by the preceding display unit in its vertical write start position specifying means.

A multi-display comprises a plurality of liquid crystal panels, and a plurality of display units that receive display data and display the display data on the liquid crystal panels, wherein each display unit comprises write means for writing display data to a frame memory, a read means for reading the display data from the frame memory, an enlarging means for increasing the display data when reading the display data from the frame memory or after reading the display data from the frame memory, a horizontal write start position specifying means for specifying a horizontal write start position from which an operation for writing the display data to the frame memory is to be started, a horizontal write width specifying means for specifying a horizontal write width in which the display data is to be written to the frame memory, a vertical write start position specifying means for specifying a vertical write start position from which an operation for writing the display data to the frame memory is to be started, a vertical write width specifying means for specifying a vertical write width in which the display data is to be written to the frame memory, an enlargement rate specifying means for specifying an enlargement rate at which the display data from the frame memory is to be magnified, a frame memory selecting means for selectively determining the frame memory from which the display data is to be read, a microcomputers for setting values in those means, an ID number assigned to the display unit, and control signal that transfers commands to the microcomputer.

In the multi-display, the same value is set in the horizontal write start position specifying means of all the display units, the same value is set in the horizontal write width specifying means of all the display units, the same value is set in the vertical write start position specifying means of all the display units, the same value is set in the vertical write width specifying means of all the display units, the same value is set in the enlargement rate specifying means of all the display units, and the same display data is displayed in the same display format by the plurality of display units.

In the multi-display, different values are set in the horizontal write start position specifying means of the display units, different values are set in the horizontal write width specifying means of the display units, different values are set in the vertical write start position specifying means of the display units, different values are set in the vertical write width specifying means of the display units, respectively, to display different regions of the display data by the plurality of display units, respectively.

In the multi-display, when first display data is displayed by the plurality of display units, the frame memory from which the display data is to be read of at least one of the plurality of display units is fixed, and then second display data is transferred to the plurality of display units to display both the first display data and the second display data simultaneously.

A multi-display comprises a plurality of liquid crystal panels, and a plurality of display units that receive display data and display the display data on the liquid crystal panels, wherein the display unit comprises a plurality of display data input means, a plurality of display data selecting means, a write means for writing the display data to a frame memory, a read means for reading the display data from the frame memory, an enlarging means for increasing the display data when reading the display data from the frame memory or after reading the display data from the frame memory, a horizontal write start position specifying means for specifying a horizontal write start position from which an operation for writing the display data to the frame memory is to be started, a horizontal write width specifying means for specifying a horizontal write width in which the display data is to be written to the frame memory, a vertical write start position specifying means for specifying a vertical write start position from which an operation for writing the display data to the frame memory is to be started, a vertical write width specifying means for specifying a vertical write width in which the display data is to be written to the frame memory, an enlargement rate specifying means for specifying an enlargement rate at which the display data from the frame memory is to be magnified, a microcomputers for setting values in those means, an ID number assigned to the display unit, and control signal that transfers commands to the microcomputer.

In the multi-display, the same value is set in the horizontal write start position specifying means of all the display units, the same value is set in the horizontal write width specifying means of all the display units, the same value is set in the vertical write start position specifying means of all the display units, the same value is set in the vertical write width specifying means of all the display units, the same value is set in the enlargement rate specifying means of all the display units, at least one of the display unit displays one of a plurality of pieces of display data, and at least another display unit displays another piece of display data.

A multi-display comprises one controller, and a plurality of display units, wherein display units display different images, respectively.

A multi-display comprises one controller, and a plurality of display units, wherein the controller is connected to the plurality of display units by one display data bus and one control signal bus, and the display units display different display data, respectively.

In the multi-display, the display data for one screen transferred from the controller is displayed over the screens of the plurality of display units.

In the multi-display, the display data for one screen transferred from the controller is displayed over the screens of the plurality of display units, and portions of the display data corresponding to the adjacent non-display regions of the plurality of display units are not displayed.

According to the present invention, the single controller controls image displaying operations for displaying images in various formats on the plurality of liquid crystal panels, and hence the multi-display system can be manufactured at a low cost.

In the embodiments of the present invention, the single controller is able to control image displaying operations for displaying motion images on the plurality of liquid crystal panels in various formats.

In the multi-display system according to the present invention, the controller does not need to perform complicated operations for processing the display data.

Since the multi-display system is provided with the display means for continuously displaying a single piece of display data over the screens of the plurality of display units, a display data supply side does not need to process the display data to display the display data continuously over the screens of the plurality of display units, and hence the multi-display system which is handled easily can be constructed.

What is claimed is:

1. A display comprising: a display unit for displaying an image; and a display controller that receives display data through a bus from an external system and controls the display unit;

wherein said display controller comprises:
an input data processor for processing input display data received through a display data bus;
a control data processor that receives control data from the external system through a control data bus, including information specifying a partial display data included in the display data;
a data output unit that sends the input display data to the display unit; and
a control unit that controls the data output unit according to the control data to send the partial display data included in the display data to the display unit;
wherein the control data is transmitted by the external system independently of the display data.

2. The display according to claim 1, wherein the control unit has a storage unit capable of storing identification data; and the data output unit is controlled in response to the identification data held by the storage unit and the information included in the control data so that the partial display data included in the display data is sent to the display unit.

3. The display according to claim 2, wherein the control data includes identification data, and the control unit controls the output unit so as to send the partial display data included in the display data to the display unit when the identification data included in the control data coincides with the identification data held by the storage unit.

4. A display comprising: a display unit for displaying an image; and a display controller that receives display data through a bus from an external system and controls the display unit;

wherein said display controller comprises:
a plurality of input data processors that receive display data from the external system through a display data bus;
a control data processor that receives control data through a control data bus from the external system;
a display data selector that selects one of the plurality of input data processors according to the received control data; and
an output unit that sends the display data of the input data processor selected by the display data selector to the display unit;
wherein the control data includes information specifying the display data; and
wherein the control data is transmitted by the external system independently of the display data.

5. A display comprising a plurality of display units, and a plurality of display controllers respectively corresponding to the plurality of display units; wherein:
the plurality of display units display images represented by display data sent thereto from the corresponding display controllers;
a first one of the display controllers comprises:
an input data processor that receives the display data through a display data bus from an external system; and
a control data processor that receives control data through a control data bus from the external system;
the control data processor having registers that store values included in the control data and indicating display start positions, a display region and a magnification specifying a mode of displaying the display data received from the external system to the display unit; and
a second one of the display controllers comprises:
an input data processor that receives display data from the first display controller; and
a control data processor that receives control data from the first display controller;
the control data processor receiving control data from the first display controller to display the display data received from the external system on the corresponding display unit, and having registers for storing values included in the input control data calculated on the basis of the relation between the first display controller and the corresponding display unit and indicating display start positions, a display region and a magnification equal to that for the first display controller;
wherein the control data includes information for determining whether the display data is displayed in each display unit; and
wherein the control data is transmitted independently of the display data.

6. The display according to claim 5, wherein each of the display controllers has a storage unit capable of storing data on positions of the display units in an arrangement of the plurality of display units; and the display data is sent to the display unit when data included in the input control data coincides with the data stored in the storage unit.

7. The display according to claim 6, wherein the plurality of display units are arranged in an M×N rectangular array, where M and N are integers.

8. A method of displaying images by a display comprising a display unit for displaying images, and a display controller for controlling the display unit, said method comprising the steps of:
receiving display data from an external system through a display data bus;
receiving control data from the external system through a control data bus, including information specifying a partial display data included in the display data;
sending the input display data to the display; and
controlling an operation according to the control data so that the partial display data included in the display data is sent to the display unit;
wherein the control data is transmitted by the external system independently of the display data.

9. The method of displaying images according to claim 8, wherein the display has a storage unit capable of storing identification data, and the partial display data included in the display data is sent to the display unit when the information specifying the partial display data and included in the control data coincides with the identification data stored in the storage unit.

10. The method of displaying images according to claim 9, wherein the control data includes identification data, and the partial display data included in the display data is sent to the display unit when the identification data included in the control data coincides with the identification data stored in the storage unit.

11. A method of displaying images by a display comprising a display unit for displaying images, a display controller that receives display data through a bus from an external system and controls the display unit, and a plurality of input data processors, said method comprising the steps of:
receiving display data through a display data bus from the external system by the plurality of input data processor;
receiving control data through a control data bus from the external system;
selecting one of the plurality of input data processors according to the input control data; and
sending the input display data to the display unit;
wherein the control data includes information specifying the display data; and
wherein the control data is transmitted by the external system independently of the display data.

12. A method of displaying images by a display comprising a plurality of display units, and a plurality of display controllers respectively corresponding to the plurality of display units; wherein:
the plurality of display units display images represented by input display data received from the display controllers;
a first one of the plurality of display controllers receives the display data through a display data bus from an external system, receives control data through a control data bus from the external system, and stores values indicating display start positions, a display region and a magnification to display the unit display data included in the control data received from the external system to the corresponding display unit; and
a second one of the plurality of display controllers receives display data from the first display controller, receives control data from the first display controller, and stores values calculated on the basis of the relation between the first display controller and the corresponding display unit and indicating display start positions, a display region and a magnification equal to that for the first display controller;
wherein the control data includes information for determining whether the display data is displayed in each display unit; and wherein the control data is transmitted independently of the display data.

13. The method of displaying images according to claim 12, wherein each of the display controllers holds data on positions of the display units in an arrangement of the plurality of display units; and the display data is sent to the display unit when data included in the input control data coincides with the stored data.

14. The method of displaying images according to claim 13, wherein the plurality of display units are arranged in an M×N rectangular array, where M and N are integers.

15. An information processing system connected to a multi-display comprising a plurality of display units, said information processing system comprising:

input means for inputting data on an arrangement of the plurality of display units;

storage means for storing the input data on the arrangement of the plurality of display units;

deciding means for deciding display positions on the plurality of display units on which the image is to be displayed by using the data on the arrangement of the plurality of display units stored in the storage means; and transmission means for transmitting control data complying with the display positions decided by the deciding means to the multi-display.

16. The information processing system according to claim 15, wherein the plurality of display units are arranged in an M×N rectangular array.

* * * * *